(12) United States Patent
Sworen et al.

(10) Patent No.: US 9,702,081 B2
(45) Date of Patent: Jul. 11, 2017

(54) POLYURETHANES DERIVED FROM NON-FLUORINATED OR PARTIALLY FLUORINATED POLYMERS

(71) Applicant: THE CHEMOURS COMPANY FC LLC, Wilmington, DE (US)

(72) Inventors: John Christopher Sworen, Chadds Ford, PA (US); Gerald Oronde Brown, Wilmington, DE (US); Tatsiana Haidzinskaya, Newark, DE (US); Ewa Kohler, West Chester, PA (US)

(73) Assignee: THE CHEMOURS COMPANY FC, LLC, Wilmington, DE (US)

( * ) Notice: Subject to any disclaimer, the term of this patent is extended or adjusted under 35 U.S.C. 154(b) by 56 days.

(21) Appl. No.: 14/852,842

(22) Filed: Sep. 14, 2015

(65) Prior Publication Data
US 2016/0090687 A1    Mar. 31, 2016

Related U.S. Application Data

(60) Provisional application No. 62/055,936, filed on Sep. 26, 2014.

(51) Int. Cl.
| | | |
|---|---|---|
| *D06M 15/277* | (2006.01) | |
| *D06M 15/273* | (2006.01) | |
| *C08G 18/78* | (2006.01) | |
| *C09D 175/04* | (2006.01) | |
| *D06M 15/564* | (2006.01) | |
| *C08G 18/62* | (2006.01) | |
| *C08G 18/79* | (2006.01) | |
| *C08G 18/81* | (2006.01) | |
| *C08G 18/28* | (2006.01) | |
| *D06M 15/263* | (2006.01) | |
| *D06M 15/285* | (2006.01) | |
| *D06M 15/576* | (2006.01) | |
| *C08F 220/24* | (2006.01) | |
| *C09D 133/06* | (2006.01) | |
| *C09D 133/14* | (2006.01) | |
| *D06M 101/06* | (2006.01) | |
| *D06M 101/32* | (2006.01) | |

(52) U.S. Cl.
CPC ......... *D06M 15/277* (2013.01); *C08F 220/24* (2013.01); *C08G 18/283* (2013.01); *C08G 18/284* (2013.01); *C08G 18/2885* (2013.01); *C08G 18/6283* (2013.01); *C08G 18/7831* (2013.01); *C08G 18/791* (2013.01); *C08G 18/8108* (2013.01); *C08G 18/8116* (2013.01); *C09D 133/066* (2013.01); *C09D 133/14* (2013.01); *C09D 175/04* (2013.01); *D06M 15/263* (2013.01); *D06M 15/273* (2013.01); *D06M 15/285* (2013.01); *D06M 15/564* (2013.01); *D06M 15/576* (2013.01); *D06M 2101/06* (2013.01); *D06M 2101/32* (2013.01); *D06M 2200/01* (2013.01); *D06M 2200/12* (2013.01)

(58) Field of Classification Search
CPC .................................................. C08G 18/6229
USPC ........................................................ 525/127
See application file for complete search history.

(56) References Cited

U.S. PATENT DOCUMENTS

| | | | |
|---|---|---|---|
| 3,907,865 A | | 9/1975 | Miyata et al. |
| 4,075,411 A | * | 2/1978 | Dickstein ............ C08F 2/30 524/43 |
| 4,600,761 A | | 7/1986 | Ruffner et al. |

(Continued)

FOREIGN PATENT DOCUMENTS

| | | |
|---|---|---|
| EP | 0617061 A1 | 3/1994 |
| JP | 09050126 | 2/1997 |
| JP | 2921065 | 7/1999 |
| JP | 2003105227 | 4/2003 |
| JP | 20055179402 | 7/2005 |
| JP | 5260093 | 9/2009 |
| WO | 0040662 A1 | 7/2000 |
| WO | 0069393 A1 | 11/2000 |
| WO | 2008022985 | 2/2008 |
| WO | 2009025043 A1 | 2/2009 |

OTHER PUBLICATIONS

International Search Report, PCT/US2015/049904, Mailed on Nov. 26, 2015.

(Continued)

*Primary Examiner* — Mike M Dollinger

(57) ABSTRACT

Polymers are described having repeat units of Formula (I):

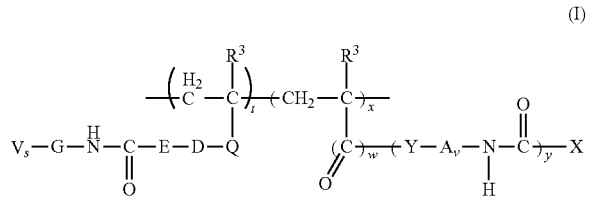

(I)

wherein $R^3$ is H or alkyl group; x and t are positive integers; Q is C(O)O, C(O)NH, or direct bond; D is alkylene, arylene, or $(CH_2CH_2O)_n(CH(CH_3)CH_2O)_m$; E is O, S, $NR^5$, or direct bond; $R^5$ is H or alkyl; G is the residue of a polyisocyanate; V is a urethane, urea, or thiourea that bonds to other parts of the polymer compound or to a monovalent blocking group; s is 1 to 5; Y is O or a substituted or unsubstituted arylene group; A is an alkylene group; w, v, and y are 0 or 1; X is the residue of a cyclic or acyclic sugar alcohol which is substituted with $-R^1$, $-C(O)R^1$, $-(CH_2CH_2O)_n(CH(CH_3)CH_2O)_mR^2$, $-(CH_2CH_2O)_n(CH(CH_3)CH_2O)_mC(O)R^1$, or mixtures thereof; n and m are independently 0 to 20; $R^1$ is independently an alkyl group; and $R^2$ is independently —H or alkyl group.

10 Claims, No Drawings

(56) References Cited

U.S. PATENT DOCUMENTS

| | | | |
|---|---|---|---|
| 4,616,074 A * | 10/1986 | Ruffner | C08F 220/04 507/119 |
| 4,663,184 A | 5/1987 | Hegel | |
| 4,743,698 A * | 5/1988 | Ruffner | C08F 220/04 507/133 |
| 4,801,475 A * | 1/1989 | Halpern | C08G 18/08 427/2.24 |
| RE33,008 E * | 8/1989 | Ruffner | C08F 220/04 507/120 |
| 4,859,780 A | 8/1989 | Molock et al. | |
| 4,959,074 A * | 9/1990 | Halpern | C08G 18/08 351/159.33 |
| 4,980,497 A | 12/1990 | Sasagawa et al. | |
| 5,023,114 A * | 6/1991 | Halpern | C08G 18/08 427/164 |
| 5,084,538 A | 1/1992 | Suzuki et al. | |
| 5,104,953 A | 4/1992 | Sasagawa et al. | |
| 5,145,927 A | 9/1992 | Suzuki et al. | |
| 5,393,607 A | 2/1995 | Kawasaki et al. | |
| 5,580,645 A | 12/1996 | Kirchner | |
| 5,869,732 A | 2/1999 | Nishikawa et al. | |
| 5,891,935 A | 4/1999 | Schneider | |
| 6,864,312 B2 | 3/2005 | Moore | |
| 6,960,079 B2 | 11/2005 | Brennan et al. | |
| 7,041,711 B2 | 5/2006 | Kunita | |
| 7,205,073 B2 | 4/2007 | Kim et al. | |
| 7,344,758 B2 | 3/2008 | Franchina et al. | |
| 7,750,093 B2 | 7/2010 | Elsbernd et al. | |
| 7,794,917 B2 | 9/2010 | Mori et al. | |
| 8,283,095 B2 | 10/2012 | Ikeda et al. | |
| 8,389,769 B2 | 3/2013 | Loccufier et al. | |
| 8,445,581 B2 | 5/2013 | Gunatillake et al. | |
| 2002/0045689 A1 | 4/2002 | Henry et al. | |
| 2004/0170922 A1 | 9/2004 | Goto | |
| 2005/0129876 A1 * | 6/2005 | Kiyohara | G02B 5/3016 428/1.2 |
| 2006/0024357 A1 * | 2/2006 | Carpenter | A61K 9/0024 424/445 |
| 2006/0052556 A1 | 3/2006 | Franchina et al. | |
| 2012/0016050 A1 | 1/2012 | Leon et al. | |
| 2012/0329905 A1 | 12/2012 | Nunez et al. | |
| 2013/0052584 A1 | 2/2013 | Iwai | |

OTHER PUBLICATIONS

Jeong et al., Applied Biochemistry and Biotechnology, vol. 129-132, 2006 265-276.
Jeong et al., Biochemical Engineering Journal, 29, 2006, 69-74.
Salit et al, Nauchi. Tri., Tashtentsk. Gos Univ. 1964, No. 263, 122-126, (Abstract Only).

\* cited by examiner

POLYURETHANES DERIVED FROM NON-FLUORINATED OR PARTIALLY FLUORINATED POLYMERS

FIELD OF INVENTION

This invention relates to urethane, urea, or thiourea compounds of isocyanate-reactive oligomers or polymers, the isocyanate-reactive oligomers or polymers being derived from substituted sugar alcohols.

BACKGROUND OF THE INVENTION

Various compositions are known to be useful as treating agents to provide water repellency and optionally stain release to textile substrates. Many such treating agents are fluorinated polymers and copolymers, or non-fluorinated polymers and copolymers. Non-fluorinated compounds are predominately polyacrylate-based or urethane-based copolymers.

Fluorinated copolymers provide good repellency to water and oil. Various attempts have been made to produce a non-fluorinated water repellent. Some non-fluorinated copolymers are known to provide water repellency and optionally stain release to textiles, but are less effective than the fluorinated counterparts.

Elsbernd et al., in U.S. Pat. No. 7,750,093, disclose a polyurethane polymer derived from oligomeric fluoroacrylates that provides oil and water repellency to textile substrates.

SUMMARY OF INVENTION

The need exists for non-fluorinated or partially fluorinated compositions that provide water repellency and optionally stain release for textiles, with performance results comparable to fluorinated treating agents. Also desirable is a non-fluorinated or partially fluorinated composition that can be bio-based derived. The present invention meets these needs.

In one embodiment, the present invention is a polymer compound comprising the repeat units of Formula (I):

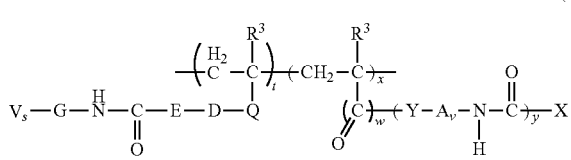

wherein $R^3$ is selected from H or a $C_1$ to $C_4$ alkyl group; x and t are integers from 1 to 200; Q is C(O)O, C(O)NH, or a direct bond; D is a $C_1$ to $C_6$ linear or branched alkylene, an arylene group, or $(CH_2CH_2O)_n(CH(CH_3)CH_2O)_m$; E is O, S, $NR^5$, or a direct bond; provided that E is a direct bond when D is $(CH_2CH_2O)_n(CH(CH_3)CH_2O)_m$; $R^5$ is H or a monovalent $C_1$ to $C_6$ alkyl; G is the residue of a diisocyanate or polyisocyanate; V is a group selected from urethane, urea, or thiourea that bonds to other parts of the polymer compound or to a monovalent blocking group; s is 1 to 5; Y is selected from O, a substituted arylene group, or an unsubstituted arylene group; A is a linear or branched $C_1$ to $C_{10}$ alkylene group; w is 0 or 1; v is 0 or 1; y is 0 or 1; provided that w+y is at least 1; if w is 0 then Y is a substituted or unsubstituted arylene group; and if Y is O then v is 1; X is the residue of a cyclic or acyclic sugar alcohol which is substituted with at least one $-R^1$, $-C(O)R^1$, $-(CH_2CH_2O)_n(CH(CH_3)CH_2O)_mR^2$, $-(CH_2CH_2O)_n(CH(CH_3)CH_2O)_mC(O)R^1$, or mixtures thereof; where the cyclic or acyclic sugar alcohol is selected from a saccharide, reduced sugar, aminosaccharide, aldonic acid, or aldonic acid lactone; wherein each n is independently 0 to 20; each m is independently 0 to 20; m+n is greater than 0; each $R^1$ is independently a linear or branched alkyl group having 5 to 29 carbons optionally comprising at least 1 unsaturated bond; and each $R^2$ is independently $-H$, a linear or branched alkyl group having 6 to 30 carbons optionally comprising at least 1 unsaturated bond, or mixtures thereof.

In another embodiment, the invention relates to a method of preparing a polymer compound comprising (i) reacting (a) at least one compound selected from Formula (IV)

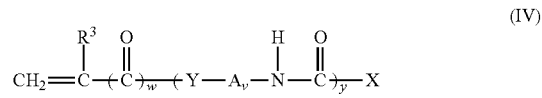

with (b) at least one compound selected from Formula (V)

(ii) optionally reacting at least one additional ethylenically unsaturated monomer; (iii) subsequently reacting the product of step (i) or (ii) with at least one diisocyanate or polyisocyanate; and (iv) optionally reacting at least one additional isocyanate-reactive compound during step (iii) or following step (iii); wherein $R^3$ is selected from H or a $C_1$ to $C_4$ alkyl group; Q is C(O)O, C(O)NH, or a direct bond; D is a $C_1$ to $C_6$ linear or branched alkylene, an arylene group, or $(CH_2CH_2O)_n(CH(CH_3)CH_2O)_m$; J is H, OH, $N(R^5)_2$, C(O)OH, or SH; provided that J is H only when D is $(CH_2CH_2O)_n(CH(CH_3)CH_2O)_m$; $R^5$ is H or a $C_1$ to $C_6$ alkyl; Y is selected from O, a substituted arylene group, or an unsubstituted arylene group; A is a linear or branched $C_1$ to $C_{10}$ alkylene group; w is 0 or 1; v is 0 or 1; y is 0 or 1; provided that w+y is at least 1; if w is 0 then Y is a substituted or unsubstituted arylene group; and if Y is O then v is 1; X is the residue of a cyclic or acyclic sugar alcohol which is substituted with at least one $-R^1$, $-C(O)R^1$, $-(CH_2CH_2O)_n(CH(CH_3)CH_2O)_mR^2$, $-(CH_2CH_2O)_n(CH(CH_3)CH_2O)_mC(O)R^1$, or mixtures thereof; where the cyclic or acyclic sugar alcohol is selected from a saccharide, reduced sugar, aminosaccharide, aldonic acid, or aldonic acid lactone; wherein each n is independently 0 to 20; each m is independently 0 to 20; m+n is greater than 0; each $R^1$ is independently a linear or branched alkyl group having 5 to 29 carbons optionally comprising at least 1 unsaturated bond; and each $R^2$ is independently $-H$, a linear or branched alkyl group having 6 to 30 carbons optionally comprising at least 1 unsaturated bond, or mixtures thereof.

DETAILED DESCRIPTION OF INVENTION

Herein all trademarks are designated with capital letters.

The present invention comprises urethanes, ureas, and thioureas made from aqueous non-fluorinated or partially fluorinated organic polymer compositions useful for imparting durable water repellency and optionally stain release to textiles. The organic polymer compositions are derived from substituted sugar alcohols. The compounds of this invention provide increased durable water repellency and optionally stain release to textiles and are comparable to several fluorinated water repellent compounds.

In one embodiment, the present invention is a polymer compound comprising the repeat units of Formula (I):

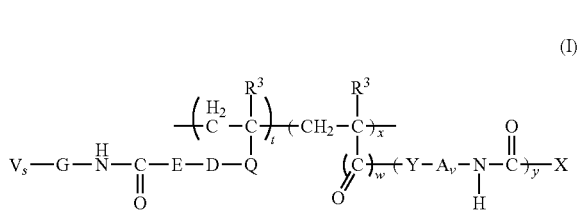

(I)

wherein $R^3$ is selected from H or a $C_1$ to $C_4$ alkyl group; x and t are integers from 1 to 200; Q is C(O)O, C(O)NH, or a direct bond; D is a $C_1$ to $C_6$ linear or branched alkylene, an arylene group, or $(CH_2CH_2O)_n(CH(CH_3)CH_2O)_m$, E is O, S, $NR^5$, or a direct bond; provided that E is a direct bond when D is $(CH_2CH_2O)_n(CH(CH_3)CH_2O)_m$; $R^5$ is H or a monovalent $C_1$ to $C_6$ alkyl; G is the residue of a diisocyanate or polyisocyanate; V is a group selected from urethane, urea, or thiourea that bonds to other parts of the polymer compound or to a monovalent blocking group; s is 1 to 5; Y is selected from O, a substituted arylene group, or an unsubstituted arylene group; A is a linear or branched $C_1$ to $C_{10}$ alkylene group; w is 0 or 1; v is 0 or 1; y is 0 or 1; provided that w+y is at least 1; if w is 0 then Y is a substituted or unsubstituted arylene group; and if Y is O then v is 1; X is the residue of a cyclic or acyclic sugar alcohol which is substituted with at least one $—R^1$, $—C(O)R^1$, $—(CH_2CH_2O)_n(CH(CH_3)CH_2O)_mR^2$, $—(CH_2CH_2O)_n(CH(CH_3)CH_2O)_mC(O)R^1$, or mixtures thereof; where the cyclic or acyclic sugar alcohol is selected from a saccharide, reduced sugar, aminosaccharide, aldonic acid, or aldonic acid lactone; wherein each n is independently 0 to 20; each m is independently 0 to 20; m+n is greater than 0; each $R^1$ is independently a linear or branched alkyl group having 5 to 29 carbons optionally comprising at least 1 unsaturated bond; and each $R^2$ is independently —H, a linear or branched alkyl group having 6 to 30 carbons optionally comprising at least 1 unsaturated bond, or mixtures thereof. The repeat units of the polymer may be situated in any order to form random copolymers, block copolymers, or other configurations, and the polymer compounds may also include additional repeat units in any order.

The term "residue of a cyclic or acyclic sugar alcohol" is herein defined as the molecular structure of a cyclic or acyclic sugar alcohol when one or more H atoms has been removed from a hydroxyl group —OH. In Formula (I), the bond of X to C=O forms an ester functional group (y=0) or urethane functional group (y=1). The term "residue of a diisocyanate or polyisocyanate" is herein defined as the molecular structure of a diisocyanate or polyisocyanate when all —NCO groups have been removed. In Formula (I), the —NCO groups from the diisocyanate or polyisocyanate form urethane, urea, or thiourea linkages to the polymer backbone, form urethane, urea, or thiourea crosslinks, or bond to an optional blocking group.

In another embodiment, the invention relates to a method of preparing a polymer compound comprising (i) reacting (a) at least one compound selected from Formula (IV)

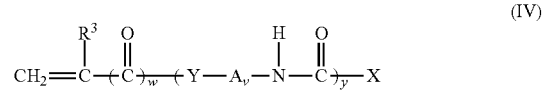

(IV)

with (b) at least one compound selected from Formula (V)

(V)

(ii) optionally reacting at least one additional ethylenically unsaturated monomer; (iii) subsequently reacting the product of step (i) or (ii) with at least one diisocyanate or polyisocyanate; and (iv) optionally reacting at least one additional isocyanate-reactive compound during step (iii) or following step (iii); wherein $R^3$ is selected from H or a $C_1$ to $C_4$ alkyl group; Q is C(O)O, C(O)NH, or a direct bond; D is a $C_1$ to $C_6$ linear or branched alkylene, an arylene group, or $(CH_2CH_2O)_n(CH(CH_3)CH_2O)_m$; J is H, OH, $N(R^5)_2$, C(O)OH, or SH; provided that J is H only when D is $(CH_2CH_2O)_n(CH(CH_3)CH_2O)_m$; $R^5$ is H or a $C_1$ to $C_6$ alkyl; Y is selected from O, a substituted arylene group, or an unsubstituted arylene group; A is a linear or branched $C_1$ to $C_{10}$ alkylene group; w is 0 or 1; v is 0 or 1; y is 0 or 1; provided that w+y is at least 1; if w is 0 then Y is a substituted or unsubstituted arylene group; and if Y is O then v is 1; X is the residue of a cyclic or acyclic sugar alcohol which is substituted with at least one $—R^1$, $—C(O)R^1$, $—(CH_2CH_2O)_n(CH(CH_3)CH_2O)_mR^2$, $—(CH_2CH_2O)_n(CH(CH_3)CH_2O)_mC(O)R^1$, or mixtures thereof; where the cyclic or acyclic sugar alcohol is selected from a saccharide, reduced sugar, aminosaccharide, aldonic acid, or aldonic acid lactone; wherein each n is independently 0 to 20; each m is independently 0 to 20; m+n is greater than 0; each $R^1$ is independently a linear or branched alkyl group having 5 to 29 carbons optionally comprising at least 1 unsaturated bond; and each $R^2$ is independently —H, a linear or branched alkyl group having 6 to 30 carbons optionally comprising at least 1 unsaturated bond, or mixtures thereof.

The compound of Formula (IV) may be formed by any suitable method, including by reacting an ethylenically unsaturated monomer having a carboxylic acid, acyl halide, amide, isocyanate, diisocyanate, polyisocyanate functional group with a cyclic or acyclic sugar alcohol which is substituted with at least one $—R^1$; $—C(O)R^1$; $—(CH_2CH_2O)_n(CH(CH_3)CH_2O)_mR^2$; $—(CH_2CH_2O)_n(CH(CH_3)CHO)_mC(O)R^1$; or mixtures thereof. For example, the compound of Formula (IV) may be made by reacting (c) a compound selected from Formula (VI)

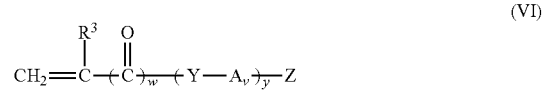

(VI)

with (d) at least one cyclic or acyclic sugar alcohol which is substituted with at least one $—R^1$, $—C(O)R^1$, $—(CH_2CH_2O)_n(CH(CH_3)CH_2O)_mR^2$, $—(CH_2CH_2O)_n(CH(CH_3)CH_2O)_mC(O)R^1$, or mixtures thereof; where Y, A, $R^3$, w, v, y, $R^1$, $R^2$, m, and n are defined as above; Z is selected from a halide, —OC(O)CR³═CH₂, —OH, or —NH₂ when y is 0 and Z is —NCO when y is 1.

The cyclic or acyclic sugar alcohol is selected from a saccharide, reduced sugar, aminosaccharide, aldonic acid, or aldonic acid lactone, and is substituted with at least one —R¹; —C(O)R¹; —(CH₂CH₂O)ₙ(CH(CH₃)CH₂O)ₘR²; —(CH₂CH₂O)ₙ(CH(CH₃)CH₂O)ₘC(O)R¹; or mixtures thereof. Such a substitution lends hydrophobic character to the polymer. In one embodiment, the cyclic or acyclic sugar alcohol is substituted with at least two —R¹; —C(O)R¹; —(CH₂CH₂O)ₙ(CH(CH₃)CH₂O)ₘR²; —(CH₂CH₂O)ₙ(CH(CH₃)CH₂O)ₘC(O)R¹; or mixtures thereof; and in another embodiment, it is substituted with at least three —R¹; —C(O)R¹; —(CH₂CH₂O)ₙ(CH(CH₃)CH₂O)ₘR²; —(CH₂CH₂O)ₙ(CH(CH₃)CH₂O)ₘC(O)R¹; or mixtures thereof. Examples of such sugar alcohols include but are not limited to aldoses and ketoses such as those compounds derived from tetroses, pentoses, hexoses, and heptoses. Specific examples include glucose, glyceraldehyde, erythrose, arabinose, ribose, arabinose, allose, altrose, mannose, xylose, lyxose, gulose, glactose, talose, fructose, ribulose, mannoheptulose, sedohelptulose, threose, erythritol, threitol, glucopyranose, mannopyranose, talopyranose, allopyranose, altropyranose, idopyranose, gulopyranose, glucitol, mannitol, erythritol, sorbitol, arabitol, xylitol, ribitol, galactitol, fucitol, iditol, inositol, pentaerythritol, dipentaerythritol, volemitol, gluconic acid, glyceric acid, xylonic acid, galactaric acid, ascorbic acid, citric acid, gluconic acid lactone, glyceric acid lactone, xylonic acid lactone, glucosamine, galactosamine, or mixtures thereof.

The cyclic or acyclic sugar alcohols are substituted with at least one —R¹; —C(O)R¹; —(CH₂CH₂O)ₙ(CH(CH₃)CH₂O)ₘR²; or —(CH₂CH₂O)ₙ(CH(CH₃)CH₂O)ₘC(O)R¹ by any suitable method, including esterification with a fatty acid, to form hydroxy-functional substituted sugar alcohols. In one embodiment, the fatty acid substitution of the cyclic or acyclic sugar alcohols has a melting point of at least −59° C. In another embodiment, the fatty acid substitution of the cyclic or acyclic sugar alcohols has a melting point of at least 0° C., and in a third embodiment, the fatty acid substitution of the cyclic or acyclic sugar alcohols has a melting point of at least 40° C. Suitable fatty acids include, but are not limited to, caprylic acid, capric acid, lauric acid, mysteric acid, palmitic acid, stearic acid, arachidic acid, behenic acid, lignoceric acid, palmitoleic acid, lineolic acid, oleic acid, erucic acid, and mixtures thereof. In one embodiment, R¹ is a linear or branched alkyl group having 7 to 29 carbons, in another embodiment, R¹ is a linear or branched alkyl group having 9 to 29 carbons, and in another embodiment, R¹ is a linear or branched alkyl group having 11 to 21 carbons. In one embodiment, R² is a linear or branched alkyl group having 8 to 30 carbons, in another embodiment, R² is a linear or branched alkyl group having 10 to 30 carbons, and in another embodiment, R² is a linear or branched alkyl group having 12 to 22 carbons.

In one embodiment, X is selected from Formulas (IIa), (IIb), or (IIc):

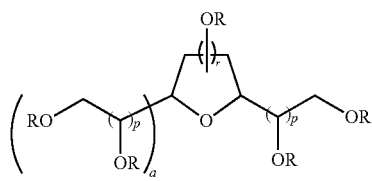

(IIa)

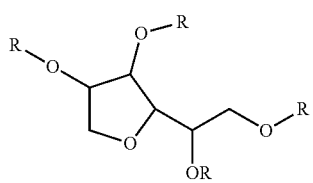

(IIb)

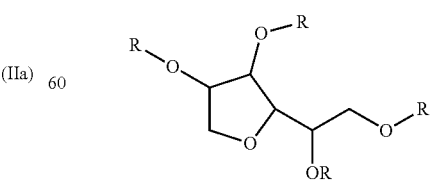

(IIc)

wherein each R is independently a direct bond to C═O of Formula I, —H, —R¹, —C(O)R¹, —(CH₂CH₂O)ₙ(CH(CH₃)CH₂O)ₘR², or —(CH₂CH₂O)ₙ(CH(CH₃)CH₂O)ₘC(O)R¹; n and m are defined as above; m+n is greater than 0; r is 1 to 3; a is 0 or 1; p is independently chosen from 0 to 2; provided that a is 0 when r is 3; each R¹ and R² are defined as above; provided when X is Formula (IIa), then one R is a direct bond to C═O of Formula 1; and at least one R is a —R¹, —C(O)R¹, —(CH₂CH₂O)ₙ(CH(CH₃)CH₂O)ₘR², or —(CH₂CH₂O)ₙ(CH(CH₃)CH₂O)ₘC(O)R¹; each R⁴ is independently a direct bond to C═O of Formula I, —H, a linear or branched alkyl group having 6 to 30 carbons optionally comprising at least 1 unsaturated bond or combinations thereof, —(CH₂CH₂O)ₙ(CH(CH₃)CH₂O)ₘR², or —(CH₂CH₂O)ₙ(CH(CH₃)CH₂O)ₘC(O)R¹; provided when X is Formula (IIb), then one R or R⁴ is a direct bond to C═O of Formula 1; and at least one R or R⁴ is a linear or branched alkyl optionally comprising at least 1 unsaturated bond or combinations thereof, —(CH₂CH₂O)ₙ(CH(CH₃)CH₂O)ₘR², or —(CH₂CH₂O)ₙ(CH(CH₃)CH₂O)ₘC(O)R¹; and each R¹⁹ is a direct bond to C═O of Formula 1, —H, —C(O)R¹, or —CH₂C[CH₂OR]₃, provided when X is Formula (IIc), then one R¹⁹ or R is a direct bond to C═O of Formula I; and at least one R¹⁹ or R is —C(O)R¹, —(CH₂CH₂O)ₙ(CH(CH₃)CH₂O)ₘR², or —(CH₂CH₂O)ₙ(CH(CH₃)CH₂O)ₘC(O)R¹. In Formulas (IIa), (IIb), or (IIc), the —(CH₂CH₂O)— represents oxyethylene groups (EO) and —(CH(CH₃)CH₂O)— represents oxypropylene groups (PO). These compounds can contain only EO groups, only PO groups, or mixtures thereof. These compounds can also be present as a tri-block copolymer designated PEG-PPG-PEG (polyethylene glycol-polypropylene glycol-polyethylene glycol), for example.

Where X is Formula (IIa), any suitable substituted reduced sugar alcohol may (d) be employed, including esters of 1,4-sorbitan, esters of 2,5-sorbitan, and esters of 3,6-sorbitan. In one embodiment, X is selected from Formula (IIa) to be Formula (IIa'):

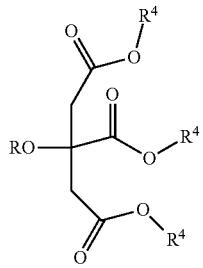

(IIa')

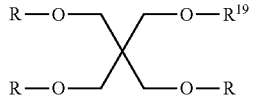

wherein R is further limited to independently a direct bond to C═O, —H, —R¹, or —C(O)R¹. In one embodiment, at least one R is —C(O)R¹ or R¹. Compounds (d) used to form residues X of Formula (IIa'), having at least one of R as —H and at least one R selected from —C(O)R$^1$, are commonly known as alkyl sorbitans. These sorbitans can be mono-substituted, di-substituted, or tri-substituted with —C(O)R$^1$. It is known that commercially available sorbitans, such as SPAN, contain a mixture of the various sorbitans ranging from where each R is H (un-substituted), and sorbitans where each R is —C(O)R$^1$ (fully substituted); wherein R$^1$ is a linear or branched alkyl group having 5 to 29 carbons; and mixtures of various substitutions thereof. The commercially available sorbitans may also include amounts of sorbitol, isosorbide, or other intermediates or byproducts.

In one embodiment, at least one R is —C(O)R$^1$, and R$^1$ is a linear branched alkyl group having 5 to 29 carbons. Preferred compounds (d) used to form these residues include mono-, di-, and tri-substituted sorbitans derived from caprylic acid, capric acid, lauric acid, mysteric acid, palmitic acid, stearic acid, arachidic acid, behenic acid, lignoceric acid, and mixtures thereof. Particularly preferred compounds used to form X include mono-, di-, and tri-substituted sorbitan stearates or sorbitan behenins.

Optionally, R$^1$ is a linear or branched alkyl group having 5 to 29 carbons comprising at least 1 unsaturated bond. Examples of compounds (d) used to form residues X of Formula (IIa') wherein at least one R is selected from —C(O)R$^1$, and R$^1$ contains least 1 unsaturated bond, include, but are not limited to, sorbitan trioleate (i.e., wherein R$^1$ is —C$_7$H$_{14}$CH=CHC$_8$H$_{17}$). Other examples include but are not limited to mono-, di-, and tri-substituted sorbitans derived from palmitoleic acid, lineolic acid, arachidonic acid, and erucic acid.

In one embodiment, X of Formula (IIa') is employed, wherein R is further limited to independently a direct bond to C=O, —H, —(CH$_2$CH$_2$O)$_n$(CH(CH$_3$)CH$_2$O)$_m$R$^2$, or —(CH$_2$CH$_2$O)$_n$(CH(CH$_3$)CH$_2$O)$_m$C(O)R$^1$. In this embodiment, at least one R is independently —(CH$_2$CH$_2$O)$_n$(CH(CH$_3$)CH$_2$O)$_m$R$^2$ or —(CH$_2$CH$_2$O)$_n$(CH(CH$_3$)CH$_2$O)$_m$C(O)R$^1$. Compounds (b) forming X of Formula (IIa'), wherein at least one R is —(CH$_2$CH$_2$O)$_n$(CH(CH$_3$)CH$_2$O)$_m$R$^2$ or —(CH$_2$CH$_2$O)$_n$(CH(CH$_3$)CH$_2$O)$_m$C(O)R$^1$, wherein each m is independently 0 to 20, each n is independently 0 to 20, and n+m is greater than 0 are known as polysorbates and are commercially available under the tradename TWEEN. These polysorbates can be mono-substituted, di-substituted, or tri-substituted with alkyl groups R$^1$ or R$^2$. It is known that commercially available polysorbates, contain a mixture of the various polysorbates ranging from where each R$^2$ is H (unsubstituted), and polysorbates where each R$^1$ is a linear or branched alkyl group having 5 to 29 carbons (fully substituted); and mixtures of various substitutions thereof. Examples of compounds used to form X of Formula (IIa') include polysorbates such as polysorbate tristearate, and polysorbate monostearate. Examples of compounds (b) used to form X of Formula (IIa') wherein m+n is greater than 0, and wherein R$^1$ comprises at least 1 unsaturated bond, include but are not limited to, polysorbate trioleate (wherein R$^1$ is C$_7$H$_{14}$CH=CHC$_8$H$_{17}$), are sold commercially under the name Polysorbate 80. Reagents may include mixtures of compounds having various values for R, R$^1$, and R$^2$, and may also include mixtures of compounds where R$^1$ comprises at least one unsaturated bond with compounds where R$^1$ is fully saturated. In one aspect, R$^2$ is H and m is a positive integer.

In one embodiment, X is selected from Formula (IIb). Compounds (d) used to form X of Formula (IIb) are known as alkyl citrates. These citrates can be present as a mono-substituted, di-substituted, or tri-substituted compound with alkyl groups. It is known that commercially available citrates contain a mixture of the various citrates as well as citric acids from where R and each R$^4$ is —H, ranging to citrates where each R$^4$ is a linear or branched alkyl group having 6 to 30 carbons optionally comprising at least 1 unsaturated bond; and mixtures of various substitutions thereof. Mixtures of citrates having various values for R$^1$, R$^2$, and R$^4$ may be used, and may also include mixtures of compounds where R$^1$ comprises at least one unsaturated bond with compounds where R$^1$ is fully saturated. Alkyl citrates are also commercially available wherein m+n is greater than 0, R$^4$ is —(CH$_2$CH$_2$O)$_n$(CH(CH$_3$)CH$_2$O)$_m$R$^2$; or —(CH$_2$CH$_2$O)$_n$(CH(CH$_3$)CH$_2$O)$_m$C(O)R$^1$ and are present in the various substitutions from wherein R and each R$^2$ is H to wherein each R$^1$ and/or R$^2$ is a linear or branched alkyl group having 5 to 30 carbons optionally comprising at least 1 unsaturated bond. Examples of compounds used to form X of Formula (IIb) include, but are not limited to, trialkyl citrates.

In one embodiment, X is selected from Formula (IIc). Compounds (d) used to form X of Formula (IIc) are known as pentaerythriol esters. These pentaerythriol esters can be present as a mono-substituted, di-substituted, or tri-substituted with alkyl groups. Preferred compounds used to form X of Formula (IIc) are dipentaerythriol esters, where R$^{19}$ is —CH$_2$C[CH$_2$OR]$_3$. It is known that commercially available pentaerythriol esters contain a mixture of the various pentaerythriol esters where R$^{19}$ and each R is —H, ranging to pentaerythriol esters where each R is —C(O)R$^1$, and R$^1$ is a linear or branched alkyl group having 5 to 29 carbons optionally comprising at least 1 unsaturated bond; and mixtures of various substitutions thereof. The pentaerythriol esters also may contain compounds with mixtures of different chain lengths for R, or mixtures of compounds where R$^1$ comprises at least one unsaturated bond with compounds where R$^1$ is fully saturated.

Compound (d) and residue X of Formulas (IIa), (IIb), and (IIc) can all be bio-based derived. By "bio-based derived", it is meant that at least 10% of the material can be produced from non-crude oil sources, such as plants, other vegetation, and tallow. In one embodiment, X is from about 10% to 100% bio-based derived. In one embodiment, X is from about 35% to 100% bio-based derived. In another embodiment, X is from about 50% to 100% bio-based derived. In one embodiment, X is from about 75% to 100% bio-based derived. In one embodiment, X is 100% bio-based derived. The average OH value of the substituted sugar alcohol compounds used to form X can range from just greater than 0 to about 230. In one embodiment, the average OH value is from about 10 to about 175, and in another embodiment, the average OH value is from about 25 to about 140.

In one embodiment, Formula (IV) is chosen such that w is 1 and y is 0. Such a compound can be formed by reacting compound (d) at least one cyclic or acyclic sugar alcohol which is substituted with at least one R$^1$, —C(O)R$^1$, —(CH$_2$CH$_2$O)$_n$(CH(CH$_3$)CH$_2$O)$_m$R$^2$, or —(CH$_2$CH$_2$O)$_n$(CH(CH$_3$)CH$_2$O)$_m$C(O)R$^1$ with a compound (c) of Formula (VI), where w is 1, y is 0, and Z is selected from a halide, —OC(O)CR$^{20}$=CH$_2$, —OH, or —NH$_2$. For example, the alcohol compound (d) may be combined with triethylamine in solvent, followed by a gradual addition of acryloyl chloride or methacryloyl chloride. The solid is removed, typically by filtration, and washed with organic solvent, and then purified, usually by extraction and water-washing, concentrating and drying under vacuum. In another method, compounds of the invention can be prepared from the substituted sugar alcohols (d) by reacting with acrylamide or with acrylic, methacrylic or chloroacrylic acid in the presence of an acid catalyst, such as toluenesulfonic acid, and a solvent, such as hexane, cyclohexane, heptane, octane, or toluene. The organic layer is washed with water, isolated, and then purified, typically by vacuum distillation. Optionally, inhibitors such as 4-methoxyphenol may be added during or after synthesis.

In another embodiment, Formula (IV) is chosen such that w is 1, y is 1, and Y is O. Such a compound can be formed by reacting compound (d) with a compound (c) of Formula (VI), where w is 1, y is 1, Y is O, and Z is —NCO. Any isocyanate compound fitting this formula may be used, and the inventive compound may be synthesized using conventional urethane synthesis techniques. In one further embodiment, Formula (IV) is chosen such that w is 0, y is 1, and Y is a substituted or unsubstituted arylene group. Such a compound may be formed by reacting compound (d) with a compound (c) of Formula (VI), where w is 0, y is 1, Y is a substituted or unsubstituted arylene group, and Z is —NCO. Any isocyanate compound fitting this formula may be used, including but not limited to substituted or unsubstituted styrene isocyanates. The inventive compounds may be synthesized using conventional urethane synthesis techniques. For example, the isocyanate compound (c) may be combined with the substituted sugar alcohol compound (d) and a catalyst in organic solvent, heating with stirring until the solution tests negative for active isocyanate groups, and collected.

In one embodiment, the invention relates to a mixture of compounds of Formula (IV). In addition to compounds of the present invention as described herein, these compositions may also comprise additional compounds that are present from commercially available sorbitans, polysorbates, alkyl citrates, or pentaethritols. These compounds can be present as a mixture of the various substituted sugar alcohols from fully unsubstituted to fully substituted, and the various substitutions in between, and optionally, the linear or branched alkyl group having 5 to 29 carbons comprises at least 1 unsaturated bond.

Compound (b) having Formula (V) may be any suitable ethylenically unsaturated monomer having an isocyanate-reactive functional group. Examples of such monomers include but are not limited to hydroxyl-functional monomers such as N-methylol acrylamide, hydroxyethyl (meth)acrylate or (meth)acrylamide, hydroxypropyl (meth)acrylate or (meth)acrylamide, hydroxybutyl (meth)acrylate or (meth)acrylamide, hydroxyhexyl (meth)acrylate or (meth)acrylamide, hydroxydecyl (meth)acrylate or (meth)acrylamide, hydroxydodecyl (meth)acrylate or (meth)acrylatemide, or ethoxylated or propoxylated (meth)acrylates or (meth)acrylamides; amine-functional monomers such as 2-(diethylamino)ethyl (meth)acrylate; and carboxylic acid-functional monomers such as acrylic acid and methacrylic acid.

One or more additional ethylenically unsaturated comonomers may be reacted with monomers of Formulas (IV) and (V), such as those having a functional group selected from linear or branched hydrocarbon, linear or branched fluorocarbon, ether, anhydride, oxyalkylene, ester, formate, carbamate, urea, amide, sulfonate, sulfonic acid, sulfonamide, halide, saturated or unsaturated cyclic hydrocarbon, morpholine, pyrrolidine, piperidine, or mixtures thereof. The additional ethylenically unsaturated monomer can be any monomer having an ethylenically unsaturated bond including, but not limited to, allyl esters such as allyl acetate, alkyl vinyl ethers, unsaturated acid esters such as linear or branched alkyl (meth)acrylates, linear or branched fluoroalkyl (meth)acrylates optionally interrupted by O, $CH_2$, $CH_2CH_2$, or $SO_2NH$, unsaturated nitriles such as acrylonitrile or methacrylonitrile, alkoxylated (meth)acrylates, (meth)acylic acid, vinyl or vinylidene chloride, glycidyl (meth)acrylate, vinyl acetate, urethane or urea (meth) acrylates, (meth)acrylamides, styrene, alpha-methylstyrene, chloromethyl-substituted styrene, ethylenediol di(meth) acrylate, 2-acrylamido-2-methyl-1-propane sulfonic acid (AMPS), and maleic anhydride. Suitable monomers include those listed above but also include other ethylenically unsaturated monomers that have been shown useful in hydrophobic polymers for fibrous substrates.

Specific fluorinated ethylenically unsaturated monomers used to incorporate fluoroalkyl functionality include but are not limited to $R_fCH_2CH_2OC(O)CR^3=CH_2$, $R_fSO_2NHCH_2CH_2OC(O)CR^3=CH_2$, $R_fCH_2CH_2SCH_2CH_2OC(O)CR^3=CH_2$, $R_fCH_2CH_2CF_2CF_2CH_2CH_2OC(O)CR^3=CH_2$, $R_fCH_2CH_2(CF_2CF_2CH_2CH_2)_2OC(O)CR^3=CH_2$, $R_fCH_2CF_2CH_2CH_2OC(O)CR^3=CH_2$, $R_fCH_2CF_2CH_2CF_2CH_2CH_2OC(O)CR^3=CH_2$, $R_fOCF_2CF_2CH_2CH_2OC(O)CR^3=CH_2$, $R_fCH_2OCH_2CH_2OC(O)CR^3=CH_2$, $R_fCHFCH_2CH_2OH$, $R_fCH_2O(CH_2)_6OC(O)CR^3=CH_2$, $(CF_3)_2CFCH_2CH_2OC(O)CR^3=CH_2$, $(CF_3)_2CFCH_2CH_2CH_2OC(O)CR^3=CH_2$, $R_fCH_2CH_2SO_2NHCH_2CH_2OC(O)CR^3=CH_2$, $R_fCH_2CH_2SO_2N(CH_3)CH_2CH_2OC(O)CR^3=CH_2$, $R_fCH_2CH_2SO_2N(CH_2CH_3)CH_2CH_2OC(O)CR^3=CH_2$, $R—(CF(CF_3)CF_2O)_yCH_2OC(O)CR^3=CH_2$, $CF_2=CFOCF_2CF(CF_3)OCF_2CF_2CH_2OC(O)CR^3=CH_2$, or $R_fCH_2OC_2F_4CH_2OCH_2CH_2OC(O)CR^3=CH_2$, where $R_f$ is a linear or branched fluoroalkyl of $C_1$-$C_{20}$, or $CH_2=CH—COO—C_2H_4—N(CH_3)—SO_2—C_2H_4—C_6F_{13}$, 2-[methyl [(3,3,4,4,5,5,6,6,6-nonfluorohexyl)sulfonyl]amino]ethyl acrylate, 2-[methyl[(3,3,4,4,5,5,6,6,7,7,8,8,8-tridecafluorooctyl)sulfonyl]amino]ethyl methacrylate, or 2-[[(3,3,4,4,5,5,6,6,7,7,8,8,8-tridecafluorooctyl)sulfonyl]amino]ethyl methacrylate. In one embodiment, $R_f$ is a $C_2$ to $C_6$ perfluoroalkyl.

The isocyanate-reactive polymers can be synthesized by any means known to one skilled in the art. For example, the monomer or monomers may be contacted in a solvent system, such as isopropyl alcohol and/or methyl isobutyl ketone, with a polymerization initiator, the mixture is heated to the activation temperature of the initiator, and the polymerization is allowed to propagate. The polymer mixture can then be contacted with an aqueous, and the organic solvents are removed, such as by distillation. The final product is an aqueous dispersion or emulsion.

When a comonomer is selected from Formula (VIIa) or Formula (VIIb),

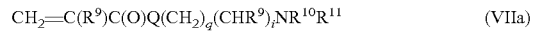

$$CH_2=C(R^9)C(O)Q(CH_2)_q(CHR^9)_iNR^{10}R^{11} \quad \text{(VIIa)}$$

$$CH_2=C(R^9)NR^{12}R^{13} \quad \text{(VIIb)}$$

or a mixture thereof, is used, wherein $R^9$ is independently selected from H or $CH_3$; $R^{10}$ and $R^{11}$ are each independently $C_1$ to $C_4$ alkyl, hydroxyethyl, or benzyl; or $R^{10}$ and $R^{11}$ together with the nitrogen atom form a morpholine, pyrrolidine, or piperidine ring; $R^{12}$ and $R^{13}$ are each independently selected from H or $C_1$ to $C_4$ alkyl; Q is —O— or —$NR^{14}$— wherein $R^{14}$ is H or $C_1$-$C_4$ alkyl; i is 0 to 4, and q is 1 to 4, then the nitrogen bonded to $R^{10}$ and $R^{11}$ may be from about 0% to 100% salinized, quaternized, or present as an amine oxide. The copolymers of this embodiment can be synthesized by any means known to one skilled in the art. The copolymer may be optionally partially or completely salinized or quaternized by conventional techniques known to those skilled in the art. In one aspect, the degree of salinization or quarternization is from about 50% to about 100%. Preferably, the copolymers are synthesized by combining the monomers in a solvent system, such as isopropyl alcohol and methyl isobutyl ketone, heating the mixture to the activation temperature of an initiator, slowly introducing an initiator into the monomer mixture, and allowing the copolymerization to propagate. The polymer mixture can then be contacted with an aqueous salinization solution, such as acetic acid solution, and the organic solvents are removed, preferably by distillation. The final product is an aqueous emulsion.

The isocyanate-reactive polymer compounds may be in form of an aqueous dispersion or aqueous emulsion, and may further comprise a solvent selected from organic solvents. The polymer compounds may be in the form of homopolymers or copolymers, and may be completely non-fluorinated or may be partially fluorinated by the copolymerization with one or more fluorinated monomers. They may have a number average molecular weight of 5000 to 200,000. In one embodiment, the polymers have a number average molecular weight of 50,000 to 200,000.

It will be apparent to one skilled in the art that many changes to any or all of the above procedures can also be used to optimize the reaction conditions for obtaining maximum yield, productivity, or product quality.

To form the urethane, urea, or thiourea-functional repeat units of Formula (I), an ethylenically unsaturated isocyanate-reactive polymer can then be reacted with at least one diisocyanate or polyisocyanate. In one embodiment, residue G is a divalent or polyvalent moiety selected from linear or branched, cyclic or acyclic, alkylene groups optionally containing at least one group selected from alkoxy, phenyl, siloxane, urethane, urea, biuret, uretdione, cyclized isocyanate, allophanate, or isocyanurate. The diidocyanate or polyisocyanate adds to the branched nature of the polymer by forming bonds at multiple points with the polymer backbone, or by linking the polymer backbone with a blocking group. The term "polyisocyanate" is defined as tri- and higher-functional isocyanates, and the term includes oligomers. Any diisocyanate or polyisocyanate having predominately two or more isocyanate groups, or any isocyanate precursor of a polyisocyanate having predominately two or more isocyanate groups, is suitable for use in this invention. For example, hexamethylene diisocyanate homopolymers are suitable for use herein and are commercially available. In this case, G would be a linear $C_6$ alkylene having cyclized isocyanate groups. It is recognized that minor amounts of diisocyanates can remain in products having multiple isocyanate groups. An example of this is a biuret containing residual small amounts of hexamethylene diisocyanate.

Also suitable for use as the polyisocyanate reactant are hydrocarbon diisocyanate-derived isocyanurate trimers, where G is a trivalent linear alkylene having an isocyanurate group. Preferred is DESMODUR N-100 (a hexamethylene diisocyanate-based compound available from Bayer Corporation, Pittsburgh, Pa.). Other triisocyanates useful for the purposes of this invention are those obtained by reacting three moles of toluene diisocyanate, where G is a trivalent polyaromatic ring structure having a cyclized isocyanate group. The isocyanurate trimer of toluene diisocyanate and that of 3-isocyanatomethyl-3,4,4-trimethylcyclohexyl isocyanate are other examples of triisocyanates useful for the purposes of this invention, as is methane-tris-(phenylisocyanate). Precursors of polyisocyanate, such as diisocyanate, are also suitable for use in the present invention as substrates for the polyisocyanates. DESMODUR N-3300, DESMODUR N-3600, DESMODUR Z-4470, DESMODUR H, DESMODUR N3790, and DESMODUR XP 2410, from Bayer Corporation, Pittsburgh, Pa., and bis-(4-isocyanato-cylohexyl)methane are also suitable in the invention.

Preferred polyisocyanate reactants are the aliphatic and aromatic polyisocyanates containing biuret structures, or polydimethyl siloxane containing isocyanates. Such polyisocyanates can also contain both aliphatic and aromatic substituents.

Preferred as the (poly)isocyanate reactant for all the embodiments of the invention herein are hexamethylene diisocyanate homopolymers commercially available, for instance as DESMODUR N-100, DESMODUR N-75 and DESMODUR N-3200 from Bayer Corporation, Pittsburgh, Pa.; 3-isocyanatomethyl-3,4,4-trimethylcyclohexyl isocyanate available, for instance as DESMODUR I (Bayer Corporation); bis-(4-isocyanatocylohexyl)methane available, for instance as DESMODUR W (Bayer Corporation) and diisocyanate trimers of formulas:

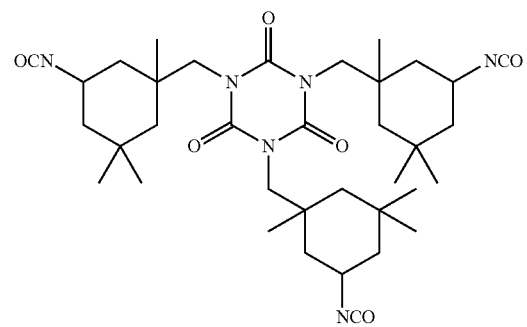

(VIIIa)

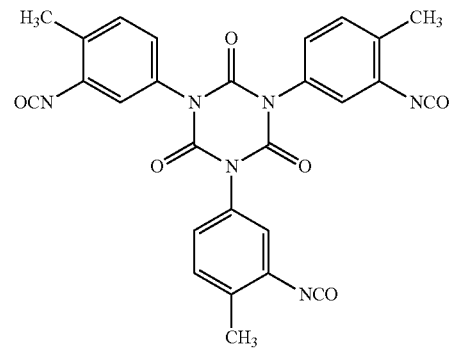

(VIIIb)

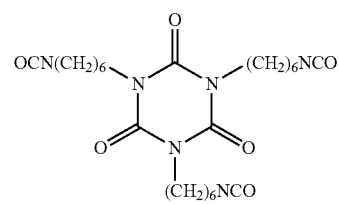

(VIIIc)

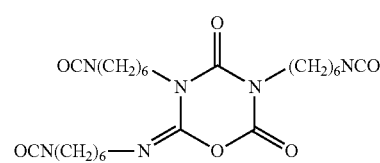

(VIIId)

13

-continued

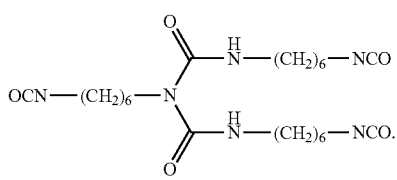
(VIIIe)

The diisocyanate trimers (VIIIa-e) are available, for instance as DESMODUR Z4470, DESMODUR IL, DESMODUR N-3300, DESMODUR XP2410, DESMODUR N100, respectively, from Bayer Corporation. In one embodiment, G is selected from Formulas (IIIa), (IIIb), (IIIc), (IIId), or (IIIe):

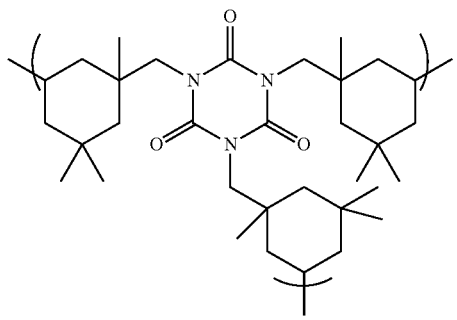
(IIIa)

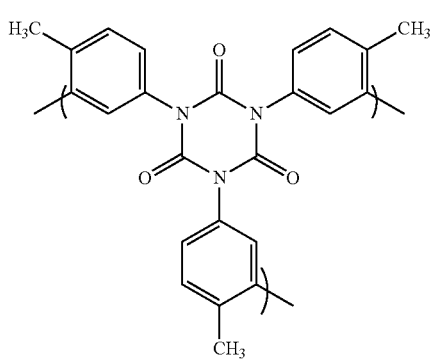
(IIIb)

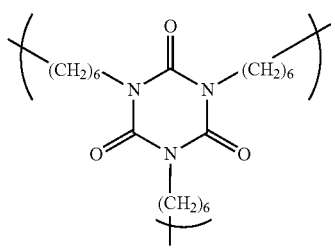
(IIIc)

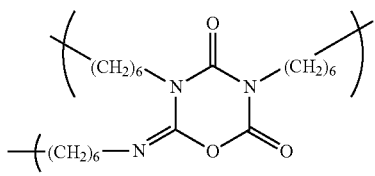
(IIId)

14

-continued

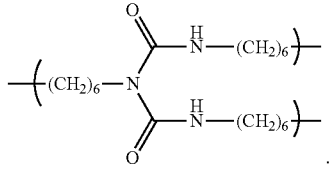
(IIIe)

In one embodiment, G is bonded with a monovalent blocking group through V. Such blocking groups are formed from compounds having one isocyanate-reactive group. In another embodiment, G-V is bonded with the polymer backbone through a multifunctional chain extender. Such chain extenders have 2 or more isocyanate-reactive functional groups. Examples of blocking compounds and chain-extenders include but are not limited to water, substituted sugar alcohol compounds (d) as described above, organic compounds of Formula (IXa)

$$R^{15}\text{-}L \qquad \text{(IXa)},$$

or organic compounds of Formula (IXb)

$$R^{14}\text{—}(OCH_2CH(OR^{14})CH_2)_z\text{—}OR^{14} \qquad \text{(IXb)},$$

or mixtures thereof, wherein $R^{15}$ is selected from a $C_1$ to $C_{30}$ linear or branched alkyl optionally comprising at least one unsaturated group, a $C_1$ to $C_{20}$ linear or branched fluoroalkyl optionally interrupted by O, $CH_2$, $CH_2CH_2$, or $SO_2NH$, a hydroxy-functional $C_1$ to $C_{30}$ linear or branched alkyl, a hydroxy-functional linear or branched $C_1$ to $C_{30}$ polyether, a hydroxy-functional linear or branched polyester having a polyester polymer backbone, a hydroxy-functional linear or branched organosiloxane, an amine-functional linear or branched organosiloxane, a thiol-functional $C_1$ to $C_{30}$ linear or branched alkyl, an amine-functional $C_1$ to $C_{30}$ linear or branched alkyl,

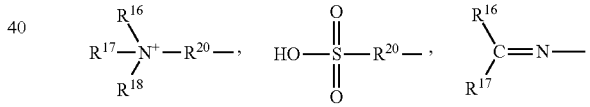

or mixtures thereof; L is selected from —N($R^{22}$)H, —OH, —COOH, —SH, —O—$(CH_2CH_2O)_m(CH(CH_3)CH_2O)_n$—H, or $(C(O)$—O—$(CH_2CH_2O)_m(CH(CH_3)CH_2O)_n$H; $R^{16}$, $R^{17}$, and $R^{18}$ are each independently, —H, —$C_1$ to $C_6$ alkyl, or combinations thereof; $R^{20}$ is a divalent alkyl group of 1 to 20 carbons; $R^{14}$ is independently selected from —H; —$R^{21}$; or —C(O)$R^{21}$, provided that at least one $R^{14}$ is —H; z is defined as above; $R^{22}$ is —H or a monovalent $C_1$ to $C_6$ alkyl group; $R^{18}$ is defined as above; and m and n are defined as above. The term "branched", as used herein, means that the functional chain can be branched at any point, for example as a quarternary substituted carbon, and can contain any number of branched substitutions. In one embodiment, V is bonded to at least one blocking group selected from a $C_1$ to $C_{30}$ linear or branched alkyl optionally comprising at least one unsaturated group, a linear or branched $C_1$ to $C_{30}$ polyether, a residue X as defined above, or a $C_1$ to $C_{20}$ linear or branched fluoroalkyl optionally interrupted by O, $CH_2$, $CH_2CH_2$, or $SO_2NH$.

In one embodiment, L is —O—$(CH_2CH_2O)_m(CH(CH_3)CH_2O)_n$—H or —[C(O)]—O—$(CH_2CH_2O)_m(CH(CH_3)CH_2O)_n$—H. In this embodiment, —$(CH_2CH_2O)$— represents oxyethylene groups (EO) and —$(CH(CH_3)CH_2O)$— represents oxypropylene groups (PO). These polyethers can contain only EO groups, only PO groups, or mixtures thereof. These polyethers can also be present as a tri-block copolymer designated PEG-PPG-PEG (polyethylene glycol-polypropylene glycol-polyethylene glycol). Preferably, the polyethers are the commercially available methoxypolyethylene glycols (MPEG's), or mixtures thereof. Also commercially available, and suitable for the preparation of the compositions of the present invention, are butoxypolyoxyalkylenes containing equal amounts by weight of oxyethylene and oxypropylene groups (Union Carbide Corp. 50-HB Series UCON Fluids and Lubricants) and having an average molecular weight greater than about 1000. In one aspect, the hydroxy-terminal polyethers of Formula (VIa) have an average molecular weight equal to or greater than about 200. In another aspect, the average molecular weight is between 350 and 2000.

In another embodiment, L is —OH, —C(O)OH, —SH, or —NH($R^{22}$); and $R^{15}$ is selected from a $C_1$ to $C_{30}$ linear or branched alkyl optionally comprising at least one unsaturated group, a $C_1$ to $C_{20}$ linear or branched fluoroalkyl optionally interrupted by O, $CH_2$, $CH_2CH_2$, or $SO_2NH$, a hydroxy-functional $C_1$ to $C_{30}$ linear or branched alkyl, a hydroxy-functional linear or branched $C_1$ to $C_{30}$ polyether, a hydroxy-functional linear or branched polyester having a polyester polymer backbone, a hydroxy- or amine-functional linear or branched organosiloxane, a thiol-functional $C_1$ to $C_{30}$ linear or branched alkyl, an amine-functional $C_1$ to $C_{30}$ linear or branched alkyl.

Where L is —OH, examples of reagents include but are not limited to alkyl alcohols such as propanol, butanol, or fatty alcohols including stearyl alcohol ($R^{15}$ is a —$C_1$ to $C_{30}$ linear or branched alkyl optionally comprising at least one unsaturated group); alkyl diols or polyols such as ethanediol, propanediol, butanediol, or hexanediol ($R^{15}$ is a hydroxy-functional $C_1$ to $C_{30}$ linear or branched alkyl); alkylene glycol ethers such as triethylene glycol, tetraethylene glycol, poly(ethylene glycol) (PEG), poly(propylene glycol) (PPG), poly(tetrahydrofuran), or glycol ethers having mixtures of PEG, PPG, or THF units ($R^{15}$ is a hydroxy-functional linear or branched $C_1$ to $C_{30}$ polyether); polyester polyols ($R^{15}$ is a hydroxy-functional linear or branched polyester having a polyester polymer backbone); silicone prepolymer polyols ($R^{15}$ is a hydroxy-functional linear or branched organosiloxane); N,N-dimethylaminoethanol ($R^{15}$ is an amine-functional $C_1$ to $C_{30}$ linear or branched alkyl); choline chloride or betaine HCl; or butanone oxime. The polyether polyols can contain only EO groups, only PO groups, only THF groups, or mixtures thereof. These polyethers can also be present as a block copolymer, such as that designated by PEG-PPG-PEG (polyethylene glycol-polypropylene glycol-polyethylene glycol). In one aspect, the polyether glycols have an average molecular weight equal to or greater than about 200. In another aspect, the average molecular weight is between 350 and 2000. Suitable fluorinated alcohols include but are not limited to $R_fCH_2CH_2OH$, $R_fSO_2NHCH_2CH_2OH$, $R_fCH_2CH_2SCH_2CH_2OH$, $R_fCH_2CH_2CF_2CF_2CH_2CH_2OH$, $R_fCH_2CH_2(CF_2CF_2CH_2CH_2)_2OH$, $R_fCH_2CF_2CH_2CH_2OH$, $R_fCH_2CF_2CH_2CF_2CH_2CH_2OH$, $R_fOCF_2CF_2CH_2CH_2OH$, $R_fCH_2OCH_2CH_2OH$, $R_fCHFCH_2CH_2OH$, $R_fCH_2O(CH_2)_6OH$, $(CF_3)_2CFCH_2CH_2OH$, $(CF_3)_2CFCH_2CH_2CH_2OH$, $R_fCH_2CH_2SO_2NHCH_2CH_2OH$, $R_fCH_2CH_2SO_2N(CH_3)CH_2CH_2OH$, $R_fCH_2CH_2SO_2N(CH_2CH_3)CH_2CH_2OH$, $R$—$(CF(CF_3)CF_2O)_yCH_2OH$, $CF_2$=$CFOCF_2CF(CF_3)OCF_2CF_2CH_2OH$, or $R_fCH_2OC_2F_4CH_2OCH_2CH_2OH$, where $R_f$ is a perfluoroalkyl of $C_1$-$C_{20}$.

Where L is —COOH, examples include but are not limited to fatty acids such as caprylic acid, capric acid, lauric acid, mysteric acid, palmitic acid, stearic acid, arachidic acid, behenic acid, lignoceric acid, palmitoleic acid, lineolic acid, arachidonic acid, oleic acid, or erucic acid ($R^{15}$ is a —$C_1$ to $C_{30}$ linear or branched alkyl optionally comprising at least one unsaturated group); hydroxy-containing acids such as hydroxycaprylic acid, hydroxycapric acid, hydroxylauric acid, hydroxymysteric acid, hydroxypalmitic acid, hydroxystearic acid, hydroxyarachidic acid, hydroxybehenic acid, hydroxylignoceric acid, hydroxypalmitoleic acid, hydroxylineolic acid, hydroxyarachidonic acid, hydroxyoleic acid, or hydroxyerucic acid ($R^{15}$ is a hydroxy-functional $C_1$ to $C_{30}$ linear or branched alkyl); and mercaptoalkanoic acids such as mercaptopropionic acid ($R^{15}$ is a thiol-functional $C_1$ to $C_{30}$ linear or branched alkyl).

Where L is —SH, specific examples include but are not limited to alkyl thiols such as lauryl mercaptan or dodecyl mercaptan ($R^{15}$ is a —$C_1$ to $C_{30}$ linear or branched alkyl optionally comprising at least one unsaturated group). Where L is —NH($R^{22}$), specific examples include but are not limited to alkyl amines such as diisopropylamine, propylamine, hexylmine, or laurylamine ($R^{15}$ is a —$C_1$ to $C_{30}$ linear or branched alkyl optionally comprising at least one unsaturated group); alkanolamines such as ethanolamine or propanolamine ($R^{15}$ is a hydroxy-functional $C_1$ to $C_{30}$ linear or branched alkyl); silicone prepolymer polyamines ($R^{15}$ is a amine-functional linear or branched organosiloxane); alkyl diamines ($R^{15}$ is an amine-functional $C_1$ to $C_{30}$ linear or branched alkyl); and aminoalkanesulfonic acids such as 2-aminoethanesulfonic acid.

In a further embodiment, the blocking or extender compound comprises fits Formula (IXb). Such compounds are commonly referred to as polyglycerols. These polyglycerols can be present where $R^{14}$ is independently a —H; —$R^{21}$; —C(O)$R^{21}$ provided that at least one $R^{14}$ is a —H; and wherein $R^{21}$ is independently a linear or branched alkyl group having 5 to 29 carbons optionally comprising at least 1 unsaturated bond. Specific examples include but are not limited to triglycerol monostearate, triglycerol distearate, hexaglycerol monostearate, hexaglycerol distearate, decaglyceryl mono(carpylate/caprate), decaglyceryl di(carpylate/caprate), decaglycerol, polyglycerol-3, and C18 diglyceride.

In one embodiment, the polymer comprises more than one type of blocking group or chain extender. In addition to compounds of the present invention as described herein, these compositions may also comprise additional compounds that are present from commercially available sorbitans, polysorbates, alkyl citrates, or pentaethritols. These compounds can be present as a mixture of the various substituted sugar alcohols from fully unsubstituted to fully substituted, and the various substitutions in between, and optionally, the linear or branched alkyl group having 5 to 29 carbons comprises at least 1 unsaturated bond.

The urethane, urea, or thiourea polymer compound is preferably part of an aqueous composition, which may further comprise a solvent selected from organic solvents. The aqueous composition is in the form of an aqueous solution, an aqueous emulsion, or an aqueous dispersion.

Aqueous compositions of the urethane, urea, or thiourea polymers can be made by reacting an isocyanate-reactive ethylenically unsaturated polymer with at least one diisocyanate or polyisocyanate. Blocking agents or chain extenders may be added during this step or sequentially. This reaction is typically conducted by charging a reaction vessel with the diisocyanate or polyisocyanate, the isocyanate-reactive ethylenically unsaturated polymer, and optionally a blocking agent or chain extender. The order of reagent addition is not critical, but if water is used, the water should be added after the isocyanates and isocyanate-reactive polymer are reacted.

The specific weight of the reactants charged is based on their equivalent weights and on the working capacity of the reaction vessel, and is adjusted so that the isocyanate-reactive polymer will be consumed in the first step. A suitable dry organic solvent free of isocyanate-reactive groups is typically used as a solvent. Ketones are the preferred solvents, and methylisobutylketone (MIBK) is particularly preferred for convenience and availability. The charge is agitated, and temperature adjusted to about 40° C. to 70° C. Typically, a catalyst such as iron(III) chloride in an organic solvent is then added, typically in an amount of from about 0.01 to about 1.0 weight % based on the dry weight of the composition, and the temperature is raised to about 80° C. to 100° C. A co-catalyst, such as sodium carbonate, may also be used. If water is to be added, the initial reaction is conducted so that less than 100% of the isocyanate groups are reacted. In the second step after holding for several hours, additional solvent, water, and optionally a second compound are added. In one embodiment, the mixture is allowed to react for several more hours or until all of the isocyanate has been reacted. Additional water can then be added along with surfactants, if desired, to the urethane compounds and stirred until thoroughly mixed. Following a homogenization or sonification step, the organic solvent can be removed by evaporation at reduced pressure, and the remaining aqueous solution or dispersion of the compound of the present invention can be used as is or subjected to further processing. Preferably, the final compound contains 0% to about 1% of reactive isocyanate groups. In one embodiment, the molecular weight of the final urethane, urea, or thiourea polymer is at least 10,000 g/mol.

It will be apparent to one skilled in the art that many changes to any or all of the above procedures can also be used to optimize the reaction conditions for obtaining maximum yield, productivity, or product quality.

The resulting polymers are useful for providing surface effects to a fibrous substrate, including water repellency and optionally stain release properties. In one embodiment, the invention is a method of treating a fibrous substrate comprising applying to the surface of a substrate a polymer of the invention. The polymer composition above is contacted with the substrate by any suitable method. Such methods include, but are not limited to, application by exhaustion, foam, flex-nip, nip, pad, kiss-roll, beck, skein, winch, liquid injection, overflow flood, roll, brush, roller, spray, dipping, immersion, and the like. The composition is also contacted by use of a beck dyeing procedure, continuous dyeing procedure or thread-line application.

The polymer of the present invention is applied to the substrate as such, or in combination with other optional textile finishes or surface treating agents. Such optional additional components include treating agents or finishes to achieve additional surface effects, or additives commonly used with such agents or finishes. Such additional components comprise compounds or compositions that provide surface effects such as no iron, easy to iron, shrinkage control, wrinkle free, permanent press, moisture control, softness, strength, anti-slip, anti-static, anti-snag, anti-pill, stain release, soil repellency, soil release, water repellency, odor control, antimicrobial, sun protection, cleanability and similar effects. Such components may be fluorinated or non-fluorinated. One or more of such treating agents or finishes are applied to the substrate before, after, or simultaneously with the composition of the present invention. For example, for fibrous substrates, when synthetic or cotton fabrics are treated, use of a wetting agent can be desirable, such as ALKANOL 6112 available from E. I. du Pont de Nemours and Company, Wilmington, Del. When cotton or cotton-blended fabrics are treated, a wrinkle-resistant resin can be used such as PERMAFRESH EFC available from Omnova Solutions, Chester, S.C.

Other additives commonly used with such treating agents or finishes are also optionally present, such as surfactants, pH adjusters, cross linkers, wetting agents, wax extenders, and other additives known by those skilled in the art. Suitable surfactants include anionic, cationic, nonionic, N-oxides and amphoteric surfactants. Examples of such additives include processing aids, foaming agents, lubricants, anti-stains, and the like. The composition is applied at a manufacturing facility, retailer location, or prior to installation and use, or at a consumer location.

Optionally, a blocked isocyanate is added with the composition of the present invention to further promote durability (i.e., as a blended composition). An example of a suitable blocked isocyanate to use in the present invention is PHOBOL XAN available from Huntsman Corp, Salt Lake City, Utah Other commercially available blocked isocyanates are also suitable for use herein. The desirability of adding a blocked isocyanate depends on the particular application for the copolymer. For most of the presently envisioned applications, it does not need to be present to achieve satisfactory cross-linking between chains or bonding to the substrate. When added as a blended isocyanate, amounts up to about 20% by weight are added.

The optimal treatment for a given substrate depends on (1) the characteristics of the compound or composition of the present invention, (2) the characteristics of the surface of the substrate, (3) the amount of compound or composition of the present invention applied to the surface, (4) the method of application of the compound or composition of the present invention onto the surface, and many other factors. Some compounds or compositions of the present invention work well on many different substrates and are repellent to water. Dispersions prepared from compounds of the present invention are generally applied to fibrous substrates by spraying, dipping, padding, or other well-known methods. After excess liquid has been removed, for example by squeeze rolls, the treated fibrous substrate is dried and then cured by heating, for example, to from about 100° C. to about 190° C., for at least 30 seconds, typically from about 60 to about 240 seconds. Such curing enhances oil-, water- and soil repellency and durability of the repellency. While these curing conditions are typical, some commercial apparatus may operate outside these ranges because of its specific design features.

In another embodiment, the present invention is a fibrous substrate treated by contacting a fibrous substrate with the polymer described above. Suitable substrates include fibers, yarns, fabrics, fabric blends, textiles, nonwovens, paper, leather, and carpets. These are made from natural or synthetic fibers including cotton, cellulose, wool, silk, rayon, nylon, aramid, acetate, acrylic, jute, sisal, sea grass, coir, polyamide, polyester, polyolefin, polyacrylonitrile, polypropylene, polyaramid, or blends thereof. By "fabric blends" is meant fabric made of two or more types of fibers. Typically these blends are a combination of at least one natural fiber and at least one synthetic fiber, but also can include a blend of two or more natural fibers or of two or more synthetic fibers. The nonwoven substrates include, for example, spunlaced nonwovens, such as SONTARA available from E. I. du Pont de Nemours and Company, Wilmington, Del., and spunbonded-meltblown-spunbonded nonwovens. The treated substrates of the present invention have excellent water repellency and optionally stain release properties.

The treated substrates of the present invention are useful in a variety of applications and products such as clothing, protective garments, carpet, upholstery, furnishings, and other uses. The excellent surface properties described above help to maintain surface cleanliness and therefore can permit longer use.

Test Methods and Materials

All solvents and reagents, unless otherwise indicated, were purchased from Sigma-Aldrich, St. Louis, Mo., and used directly as supplied. Methyl isobutyl ketone (MIBK) and poly(ethylene glycol) methacrylate MW=360 (7-EO methacrylate) are both available from Sigma-Aldrich, St. Louis, Mo.

NUJOL is a mineral oil having a Saybolt viscosity of 360/390 s at 38° C. and a specific gravity of 0.880/0.900 g/cm3 at 15° C., available from Plough, Inc., Kenilworth, N.J.

Sorbitan tristearate are commercially available from Croda, East Yorkshire, England, or DuPont Nutrition & Health, Copenhagen, Denmark.

2-Methyl-2-propenoic acid, 3,3,4,4,5,5,6,6,7,7,8,8,8-tridecafluorooctyl ester (62-FMA) and 2-propenoic acid, 3,3,4,4,5,5,6,6,7,7,8,8,8-tridecafluorooctyl ester (62-FA), and 3,3,4,4,5,5,6,6,7,7,8,8,8-Tridecafluoro-1-octanol (6,2-alcohol) are commercially available from DuPont Chemicals and Fluoroproducts, Wilmington, Del.

N-(isobutoxymethyl)methacrylamide was obtained from Polysciences, Inc., Warrington, Pa.

DESMODUR N-100 is available from Bayer, Pittsburgh, Pa.

The following test methods and materials were used in the examples herein.

Test Method 1—Fabric Treatment

The fabrics treated in this study were 100% by weight khaki cotton twill available from SDL Atlas Textile Testing Solutions, Rock Hill, S.C. 29732 and 100% by weight red polyester fabric available from L. Michael OY, Finland. The fabric was treated with the aqueous dispersions of various emulsion polymers using a conventional pad bath (dipping) process. The prepared concentrated dispersions were diluted with deionized water to achieve a pad bath having 60 g/L or 100 g/L of the product in the bath. For the treatment of the cotton fabric, a wetting agent, INVADINE PBN and a catalyzed cross-linking agent, KNITTEX 7636 (all available from Huntsman, Salt Lake City, Utah) were also included in the bath at 5 g/L and 30 g/L respectively. The fabric was padded in the bath, and the excess liquid was removed by squeeze rollers. The wet pickup was around 95% on the cotton substrate. The "wet pick up" is the weight of the bath solution of the emulsion polymer and additives applied to the fabric, based on the dry weight of the fabric. The fabric was cured at approximately 165° C. for 3 minutes and allowed to "rest" after treatment and cure for at least 15 hours.

For the treatment of the polyester fabric, a wetting agent, INVADINE PBN (available from Huntsman, Charlotte, N.C., USA) and 20% acetic acid were also included in the bath at 5 g/L and 1 g/L respectively. The fabric was padded in the bath, and the excess liquid removed by squeeze rollers. The wet pickup was around 55% on the polyester substrate. The "wet pick up" is the weight of the bath solution of the emulsion polymer and additives applied to the fabric, based on the dry weight of the fabric. The fabric was cured at approximately 160° C. for 2 minutes and allowed to "rest" after treatment and cure for about 15 to about 18 hours.

Test Method 2—Water Drop

The water repellency of a treated substrate was measured according to the DuPont Technical Laboratory Method as outlined in the TEFLON Global Specifications and Quality Control Tests information packet. The test determines the resistance of a treated substrate to wetting by aqueous liquids. Drops of water-alcohol mixtures of varying surface tensions are placed on the fabric and the extent of surface wetting is determined visually. The test provides a rough index of aqueous stain resistance. The higher the water repellency rating, the better the resistance the finished substrate has to staining by water-based substances. The composition of standard test liquids is shown in the following Table 1. Ratings of 0.5 increments are determined by subtracting one half from the numbers in Table 1 for borderline passing of the test liquid.

TABLE 1

| Standard Test Liquids | | |
|---|---|---|
| Water Repellency Rating Number | Composition Vol. %, Isopropyl Alcohol | Composition, Vol. % Distilled Water |
| 1 | 2 | 98 |
| 2 | 5 | 95 |
| 3 | 10 | 90 |
| 4 | 20 | 80 |
| 5 | 30 | 70 |
| 6 | 40 | 60 |
| 7 | 50 | 50 |
| 8 | 60 | 40 |
| 9 | 70 | 30 |
| 10 | 80 | 20 |
| 11 | 90 | 10 |
| 12 | 100 | 0 |

Test Method 3—Oil Repellency

The treated fabric samples were tested for oil repellency by a modification of AATCC standard Test Method No. 118, conducted as follows: A fabric sample, treated with an aqueous dispersion of polymer, was conditioned for a minimum of 15 hours at 23° C.+65% relative humidity prior to testing. A series of organic liquids, identified below in Table 2, were then applied drop wise to the fabric samples. Beginning with the lowest numbered test liquid (Repellency Rating No. 1), one drop (approximately 5 mm in diameter or 0.05 mL volume) was placed on each of three locations at least 5 mm apart. The drops were observed for 30 seconds. If, at the end of this period, two of the three drops were still spherical in shape with no wicking around the drops, three drops of the next highest numbered liquid were placed on adjacent sites and similarly observed for 30 seconds. The procedure was continued until one of the test liquids resulted in two of the three drops failing to remain spherical to hemispherical, or wetting or wicking occurred.

The oil repellency rating of the fabric was the highest numbered test liquid for which two of the three drops remained spherical to hemispherical, with no wicking for 30 seconds. Ratings of 0.5 increments were determined by subtracting one-half from the number in Table 2 for borderline passing of the next liquid. Higher ratings indicate greater repellency. The composition of oil repellency test liquids is shown in the Table 2.

TABLE 2

Oil Repellency Test Liquids

| Oil Repellency Rating | Test Solution |
|---|---|
| 1 | NUJOL Purified Mineral Oil |
| 2 | 65/35 NUJOL/n-hexadecane by volume at 21° C. |
| 3 | n-hexadecane |
| 4 | n-tetradecane |
| 5 | n-dodecane |
| 6 | n-decane |

Test Method 4—Spray Test

The dynamic water repellency of treated substrates was measured according to the American Association of Textile Chemists and Colorists (AATCC) TM-22. Samples are visually scored by reference to published standards, with a rating of 100 denoting no water penetration or surface adhesion. A rating of 90 denotes slight random sticking or wetting without penetration; lower values indicate progressively greater wetting and penetration. Test Method 2, the dynamic water repellency test, is a demanding and realistic test of water repellency.

Test Method 5—Stain Release

This test measures the ability of a fabric to release oily stains during home laundering.

Treated textiles are placed on a flat surface. Using an eyedropper, 5 drops of MAZOLA Corn Oil or mineral oil (0.2 mL) were placed onto the fabric to form 1 drop of oil. A weight (5 lb, 2.27 kg) is placed on top of the oil drop with a piece of glassine paper separating the oil drop. The weight was left in place for 60 seconds. After 60 seconds, the weight and glassine paper are removed. The textiles samples were then washed using a automatic washer high for 12 minutes with AATCC 1993 Standard Reference Detergent WOB12 or granular detergent (100 g). The textiles were then dried on high for 45-50 minutes. The textiles were then evaluated for residual stain of 1 to 5, 1 having the largest residual stain remaining and 5 being no stain residual was visible. In the examples below, stain release ratings of corn oil are designated by the term "Corn Oil", and stain release ratings of mineral oil are designated by the term "Mineral Oil".

Examples of the compounds and compositions of the instant invention can be made from various reactive ethylenically unsaturated monomers and various substituted sugar alcohols, or mixtures thereof. The present invention is not to be limited by the examples below.

Comparative Example A

Untreated fabric samples were tested according to the test methods above. Both cotton and polyester fabrics had a water drop rating of 0, an oil drop rating of 0, and a spray rating of 0.

Preparation of a Sorbitan Tristearate Methacrylate Monomer (M1)

$CH_2=C(CH_3)-C(O)-STS$, where STS is the residue of sorbitan tristearate

A dry 1-L round bottom four neck flask was assembled with a thermocouple, mechanical stirrer, a nitrogen inlet, condenser, and gas outlet. The flask was charged with sorbitan tristearate (100 g, OH value 76, 162.57 mmol), dichloromethane (300 g), and triethylamine (17.82 g, 176.11 mmol). Methacryloyl chloride (15.79 mL, 162.57 mmol) was slowly added to the solution via syringe. The flask was insulated with foil. The reaction mixture was stirred under nitrogen at room temperature for 48 hours, at which point 200 mL of ether was added. Triethyl ammonium chloride was removed by filtration. Organic layers were washed with 5 wt % acetic acid solution (250 mL), the aqueous layer was extracted with dichloromethane, and the organic layers were washed with saturated $NaHCO_3$ solution. The organic layers were dried with $MgSO_4$ and filtered. 0.01 g of p-methoxyphenol polymerization inhibitor was added, and organic solvent was removed via rotary evaporation without heating. The product was a light yellow solid at room temperature.

Preparation of a Sorbitan Tristearate Urethane Methacrylate (M2)

$CH_2=C(CH_3)-C(O)OCH_2CH_2NHC(O)-STS$, where STS is the residue of sorbitan tristearate A dry 4-neck 500 mL round bottom flask was assembled with a thermocouple, mechanical stirrer, nitrogen inlet, condenser, and gas outlet. The flask was charged with 2-isocyanatoethyl methacrylate (25.0 g, 161.13 mmol), MIBK (141.44 g), and a solution of 0.50 weight % $FeCl_3$ in MIBK (2.5 g). The mixture was heated to 60° C., and sorbitan tristearate (118.94 g, OH value 76) was added to the flask. The temperature was then raised to 80° C. and stirred overnight. After 24 hours, 1,8-diazabicycloundec-7-ene (0.05 g) was added, and the reaction mixture was stirred for another 24 hours at 80° C. When the solution tested negative for isocyanates, it was filtered through a milk filter and collected.

Preparation of a Sorbitan Tristearate Urethane Styrene Monomer (M3)

$CH_2=CH-(C_6H_4)-C(CH_3)_2-NHC(O)-STS$, where STS is the residue of sorbitan tristearate A dry 4-neck 500 mL round bottom flask was assembled with a thermocouple, mechanical stirrer, nitrogen inlet, condenser, and gas outlet. The flask was charged with 3-isopropenyl-α,α-dimethylbenzyl isocyanate (36.0 g, 178.8 mmol), MIBK (168 g), a solution of 0.50 weight % $FeCl_3$ in MIBK (6.0 g), and 1,8-diazabicycloundec-7-ene (0.1 g). The mixture was heated to 60° C. Sorbitan tristearate (132.04 g, 178.8 mmol) was added to the flask. The temperature was then raised to 80° C. and stirred overnight. When the solution tested negative for isocyanates, it was cooled to 45° C., filtered through a milk filter, and collected.

Preparation of Methacrylic Polymers 1-4 (P1-P4)

Stock solution of 7-EO methacrylate, N-iso-butoxymethylmethacrylamide, hydroxyethyl methacrylate, and dodecyl mercaptan was prepared at 50% by weight in MIBK according to the amounts in Table 3. Additional monomers and MIBK were combined with stock solution and initiator in a 30-mL vial. The vial was capped and a nitrogen line was connected. Most reactions run at 25-40% solids in MIBK. The reaction was heated to 80° C. overnight. When vinylidene chloride was present, the reaction mixture was instead heated to 50° C. and then temperature was slowly increased to 80° C. (10° C. every 15 minutes) and stirred overnight.

TABLE 3

Reagents of Polymers P1-P4

| Example | P1 | P2 | P3 | P4 |
|---|---|---|---|---|
| Reagents (g) | | | | |
| M1 | 2.38 | 10.94 | 2.37 | 10.92 |
| 6,2-FMA | 4.00 | — | 4.00 | — |
| 7-EO methacrylate | 0.08 | 0.08 | 0.08 | 0.08 |
| Stearyl methacrylate | 1.00 | — | 1.03 | — |
| N-iso-butoxymethyl methacrylamide | 0.11 | 0.11 | 0.11 | 0.11 |
| Hydroxyethyl methacrylate | 0.09 | 0.09 | 0.09 | 0.09 |
| Dodecyl mercaptan | 0.03 | 0.03 | 0.03 | 0.03 |

TABLE 3-continued

Reagents of Polymers P1-P4

| Example | P1 | P2 | P3 | P4 |
|---|---|---|---|---|
| Vinylidene chloride | — | — | 0.72 | 0.67 |
| VAZO 67 | 0.13 | 0.13 | 0.15 | 0.14 |

Preparation of Urethane Methacrylic Polymers 5-8 (P5-P8)

The synthesis of P1 was repeated using the reagents of Table 4.

TABLE 4

Reagents of Polymers P5-P8

| Example | P5 | P6 | P7 | P8 |
|---|---|---|---|---|
| Reagents (g) | | | | |
| M2 | 2.64 | 11.60 | 2.79 | 12.12 |
| 6,2-FMA | 4.00 | — | 4.00 | — |
| 7-EO methacrylate | 0.08 | 0.08 | 0.08 | 0.08 |
| Stearyl methacrylate | 1.01 | — | 1.03 | — |
| N-iso-butoxymethyl methacrylamide | 0.11 | 0.11 | 0.11 | 0.11 |
| Hydroxyethyl methacrylate | 0.09 | 0.09 | 0.09 | 0.09 |
| Dodecyl mercaptan | 0.03 | 0.03 | 0.03 | 0.03 |
| Vinylidene chloride | — | — | 0.67 | 0.69 |
| VAZO 67 | 0.13 | 0.13 | 0.15 | 0.14 |

Preparation of Polymers 9-12 (P9-P12)

The synthesis of P1 was repeated using the reagents of Table 5.

TABLE 5

Reagents of Polymers P9-P12

| Example | P9 | P10 | P11 | P12 |
|---|---|---|---|---|
| Reagents (g) | | | | |
| M3 | 2.77 | 12.74 | 2.77 | 12.73 |
| 6,2-FMA | 4.01 | — | 4.01 | — |
| 7-EO methacrylate | 0.08 | 0.08 | 0.08 | 0.08 |
| Stearyl methacrylate | 1.02 | — | 1.00 | — |
| N-iso-butoxymethyl methacrylamide | 0.11 | 0.11 | 0.11 | 0.11 |
| Hydroxyethyl methacrylate | 0.09 | 0.09 | 0.09 | 0.09 |
| Dodecyl mercaptan | 0.03 | 0.03 | 0.03 | 0.03 |
| Vinylidene chloride | — | — | 0.66 | 0.67 |
| VAZO 67 | 0.13 | 0.13 | 0.14 | 0.14 |

Preparation of Polymers 13-18 (P13-P18)

The monomers and initiator were added into a 30 mL vial according to the amounts listed in Table 6. The vial was capped and a nitrogen line was connected. The reaction mixture was heated to 80° C. and stirred overnight.

TABLE 6

Reagents of Polymers P13-P18

| | Example | | | | | |
|---|---|---|---|---|---|---|
| | P13 | P14 | P15 | P16 | P17 | P18 |
| Reagent Amounts (g) | | | | | | |
| M1 | 2.59 | 12.34 | — | — | — | — |
| M2 | — | — | 2.87 | 9.57 | — | — |
| M3 | — | — | — | — | 3.02 | 10.06 |
| 6,2-FMA | 4.64 | — | 4.64 | — | 4.64 | — |
| Hydroxyethyl methacrylate | 1.1 | 1.1 | 1.1 | 0.77 | 1.1 | 0.77 |
| Stearyl methacrylate | 1.04 | — | 1.04 | — | 1.04 | — |
| VAZO 67 | 0.08 | 0.08 | 0.08 | 0.08 | 0.08 | 0.08 |

Examples 1-4

Amounts of reagents are listed in Table 7. In a small vial, sorbitan tristearate, sodium carbonate, isocyanate-reactive polymer (0.00045 mol OH) and excess MIBK were mixed in a 30-mL vial and heated to 55° C. under nitrogen atmosphere. Once the temperature stabilized, DESMODUR N100 was added and the temperature was increased to 80° C. After temperature reached 80° C., $FeCl_3$ catalyst was added (0.02-0.04 g, 0.5 weight % solution in MIBK) and the reaction was heated at 95° C. for 4 hours. After 4 hours, n-butanol (0.02 g) was added, and the temperature was reduced to 90° C. overnight. If the reaction tested positive for active isocyanates, additional catalyst and water were added to quench the reaction. When the reaction tested negative for active isocyanates, the reaction was diluted to 10% solids in MIBK, applied to fabric, and tested according to the above test methods.

TABLE 7

Reagents and Performance of Examples 1-4

| | Example | | | |
|---|---|---|---|---|
| | 1 | 2 | 3 | 4 |
| Hydroxy-functional Polymer | | | | |
| Polymer Used | P1 | P2 | P3 | P4 |
| Amount Used (g) | 4.67 | 5.56 | 4.19 | 7.01 |
| Additional Reagents | | | | |
| Sorbitan tristearate (g) | 1.12 | 0.83 | 0.84 | 0.84 |
| Sodium Carbonate (g) | 0.01 | 0.02 | 0.02 | 0.01 |
| DESMODUR N100 (g) | 0.41 | 0.31 | 0.28 | 0.29 |
| N-butanol | 0.02 | 0.02 | 0.03 | 0.03 |
| Cotton Performance | | | | |
| Water Drop | 10 | 4 | 11 | 5 |
| Oil Drop | 5 | 0 | 5 | 0 |
| Spray | 90 | 90 | 85 | 85 |
| Polyester Performance | | | | |
| Water Drop | 7 | 4 | 8 | 3 |
| Oil Drop | 4 | 0 | 4 | 0 |
| Spray | 95 | 90 | 85 | 95 |

Examples 5-8

Example 1 was repeated, using the reagents in Table 8.

TABLE 8

Reagents and Performance of Examples 5-8

|  | Example | | | |
|---|---|---|---|---|
|  | 5 | 6 | 7 | 8 |
| Hydroxy-functional Polymer | | | | |
| Polymer Used | P5 | P6 | P7 | P8 |
| Amount Used (g) | 3.82 | 6.08 | 4.33 | 6.13 |
| Additional Reagents | | | | |
| Sorbitan tristearate (g) | 0.84 | 0.83 | 0.83 | 0.84 |
| Sodium Carbonate (g) | 0.01 | 0.01 | 0.02 | 0.01 |
| DESMODUR N100 (g) | 0.28 | 0.31 | 0.30 | 0.27 |
| N-butanol | 0.02 | 0.02 | 0.02 | 0.03 |
| Cotton Performance | | | | |
| Water Drop | 10 | 4 | 10 | 4 |
| Oil Drop | 5 | 0 | 5 | 0 |
| Spray | 90 | 95 | 80 | 100 |
| Polyester Performance | | | | |
| Water Drop | 8 | 4 | 8 | 3 |
| Oil Drop | 4 | 0 | 4 | 0 |
| Spray | 90 | 95 | 90 | 100 |

Examples 9-12

Example 1 was repeated, using the reagents in Table 9.

TABLE 9

Reagents and Performance of Examples 9-12

|  | Example | | | |
|---|---|---|---|---|
|  | 9 | 10 | 11 | 12 |
| Hydroxy-functional Polymer | | | | |
| Polymer Used | P9 | P10 | P11 | P12 |
| Amount Used (g) | 4.04 | 8.41 | 4.33 | 6.86 |
| Additional Reagents | | | | |
| Sorbitan tristearate (g) | 0.83 | 0.83 | 0.84 | 0.83 |
| Sodium Carbonate (g) | 0.01 | 0.02 | 0.01 | 0.01 |
| DESMODUR N100 (g) | 0.27 | 0.43 | 0.31 | 0.29 |
| N-butanol | 0.02 | 0.02 | 0.02 | 0.03 |
| Cotton Performance | | | | |
| Water Drop | 10 | 4 | 10 | 4 |
| Oil Drop | 5 | 0 | 5 | 0 |
| Spray | 85 | 85 | 80 | 80 |
| Polyester Performance | | | | |
| Water Drop | 8 | 3 | 8 | 4 |
| Oil Drop | 4 | 0 | 4 | 0 |
| Spray | 95 | 85 | 90 | 80 |

Examples 13-15

Example 1 was repeated, using the reagents in Table 10.

TABLE 10

Reagents and Performance of Examples 13-15

|  | Example | | |
|---|---|---|---|
|  | 13 | 14 | 15 |
| Hydroxy-functional Polymer | | | |
| Polymer Used | P13 | P14 | P14 |
| Amount Used (g) | 1.17 | 11.00 | 1.73 |
| Additional Reagents | | | |
| Sorbitan tristearate (g) | 1.66 | 0.84 | 1.66 |
| Sodium Carbonate (g) | 0.02 | 0.01 | 0.02 |
| DESMODUR N100 (g) | 0.60 | 0.31 | 0.60 |
| N-butanol | 0.04 | 0.04 | 0.05 |
| Cotton Performance | | | |
| Water Drop | 8 | 4 | 4 |
| Oil Drop | 4 | 0 | 0 |
| Spray | 75 | 90 | 100 |
| Polyester Performance | | | |
| Water Drop | 5 | 3 | 3 |
| Oil Drop | 3 | 0 | 0 |
| Spray | 80 | 95 | 90 |

Examples 16-19

Example 1 was repeated, using the reagents in Table 11.

TABLE 11

Reagents and Performance of Examples 16-19

|  | Example | | | |
|---|---|---|---|---|
|  | 16 | 17 | 18 | 19 |
| Hydroxy-functional Polymer | | | | |
| Polymer Used | P15 | P15 | P16 | P16 |
| Amount Used (g) | 1.36 | 6.65 | 1.89 | 5.34 |
| Additional Reagents | | | | |
| Sorbitan tristearate (g) | 1.66 | 0.83 | 1.67 | 0.55 |
| Sodium Carbonate (g) | 0.02 | 0.01 | 0.02 | 0.01 |
| DESMODUR N100 (g) | 0.60 | 0.29 | 0.59 | 0.22 |
| N-butanol | 0.05 | 0.03 | 0.05 | 0.01 |
| Cotton Performance | | | | |
| Water Drop | 8 | 9 | 4 | 4 |
| Oil Drop | 4 | 4 | 0 | 2 |
| Spray | 80 | 80 | 90 | 80 |
| Polyester Performance | | | | |
| Water Drop | 5 | 7 | 3 | 3 |
| Oil Drop | 3 | 3 | 0 | 0 |
| Spray | 80 | 80 | 100 | 95 |

Examples 20-23

Example 1 was repeated, using the reagents in Table 12.

TABLE 12

Reagents and Performance of Examples 20-23

| | Example | | | |
|---|---|---|---|---|
| | 20 | 21 | 22 | 23 |
| Hydroxy-functional Polymer | | | | |
| Polymer Used | P17 | P17 | P18 | P18 |
| Amount Used (g) | 1.20 | 4.83 | 2.13 | 11.80 |
| Additional Reagents | | | | |
| Sorbitan tristearate (g) | 1.66 | 0.84 | 1.81 | 1.83 |
| Sodium Carbonate (g) | 0.02 | 0.02 | 0.03 | 0.01 |
| DESMODUR N100 (g) | 0.60 | 0.30 | 0.66 | 0.29 |
| N-butanol | 0.04 | 0.02 | 0.07 | 0.02 |
| Cotton Performance | | | | |
| Water Drop | 8 | 9 | 3 | 4 |
| Oil Drop | 3 | 4 | 0 | 0 |
| Spray | 80 | 75 | 75 | 80 |
| Polyester Performance | | | | |
| Water Drop | 5 | 7 | 3 | 3 |
| Oil Drop | 2 | 3 | 0 | 0 |
| Spray | 80 | 85 | 80 | 90 |

Examples 24-28

Amounts of reagents used are shown in Table 12. Into a small vial, N100, sodium carbonate, 6.2 alcohol, and isocyanate-reactive polymer (0.0003 mol of OH) were charged and heated to 35° C. The temperature was gradually increased to 60° C. at a rate of 10° C./10 min. At 60° C., $FeCl_3$ catalyst (0.02-0.04 g, 0.5 weight % solution in MIBK) was added, and the reaction was slowly heated to 95° C. at a rate of 5° C./10 min. After 4 hours at 95° C., water was added. The reaction was held at 95° C. overnight. If reaction tested positive for active isocyanates, ~0.02 g of sodium carbonate and extra catalyst were added. Once the reaction tested negative for active isocyanates, the reaction was diluted to 10% solids in MIBK, applied to fabric, and tested according to the above test methods.

TABLE 13

Reagents and Performance of Examples 24-28

| | Example | | | | |
|---|---|---|---|---|---|
| | 24 | 25 | 26 | 27 | 28 |
| Hydroxy-functional Polymer | | | | | |
| Polymer Used | P1 | P2 | P3 | P4 | P14 |
| Amount Used (g) | 3.07 | 4.46 | 3.41 | 4.51 | 1.49 |
| Additional Reagents | | | | | |
| 6,2-alcohol (g) | 0.14 | 0.17 | 0.13 | 0.29 | 0.25 |
| Sodium Carbonate (g) | 0.01 | 0.01 | 0.03 | 0.04 | 0.02 |
| DESMODUR N100 (g) | 0.29 | 0.30 | 0.30 | 0.30 | 0.60 |
| Water (g) | 0.03 | 0.04 | 0.04 | 0.03 | 0.25 |
| Cotton Performance | | | | | |
| Water Drop | 11 | 4 | 11 | 3 | 4 |
| Oil Drop | 5 | 0 | 6 | 2 | 4 |
| Spray | 85 | 80 | 80 | 70 | 70 |
| Polyester Performance | | | | | |
| Water Drop | 8 | 3 | 7 | 3 | 3 |
| Oil Drop | 4 | 0 | 4 | 1 | 4 |
| Spray | 90 | 70 | 95 | 70 | 60 |

Examples 29-34

Example 24 was repeated, using the reagents in Table 14.

TABLE 14

Reagents and Performance of Examples 29-34

| | Example | | | | | |
|---|---|---|---|---|---|---|
| | 29 | 30 | 31 | 32 | 33 | 34 |
| Hydroxy-functional Polymer | | | | | | |
| Polymer Used | P5 | P6 | P7 | P8 | P15 | P16 |
| Amount Used (g) | 3.10 | 5.20 | 3.46 | 4.96 | 1.04 | 1.64 |
| Additional Reagents | | | | | | |
| 6,2-alcohol (g) | 0.14 | 0.15 | 0.15 | 0.12 | 0.26 | 0.24 |
| Sodium Carbonate (g) | 0.01 | 0.01 | 0.04 | 0.02 | 0.03 | 0.02 |
| DESMODUR N100 (g) | 0.30 | 0.30 | 0.30 | 0.31 | 0.60 | 0.60 |
| Water (g) | 0.04 | 0.03 | 0.04 | — | — | — |
| Cotton Performance | | | | | | |
| Water Drop | 11 | 4 | 11 | 4 | 8 | 5 |
| Oil Drop | 3 | 0 | 5 | 0 | 5 | 2 |
| Spray | 70 | 80 | 85 | 85 | 80 | 60 |
| Polyester Performance | | | | | | |
| Water Drop | 7 | 4 | 7 | 3 | 5 | 2 |
| Oil Drop | 4 | 2 | 4 | 0 | 3 | 1 |
| Spray | 90 | 80 | 80 | 100 | 80 | 60 |

Examples 35-40

Example 24 was repeated, using the reagents in Table 15.

TABLE 15

Reagents and Performance of Examples 35-40

| | Example | | | | | |
|---|---|---|---|---|---|---|
| | 35 | 36 | 37 | 38 | 39 | 40 |
| Hdroxy-functional Polymer | | | | | | |
| Polymer Used | P9 | P10 | P11 | P12 | P17 | P18 |
| Amount Used (g) | 3.32 | 3.84 | 3.62 | 5.18 | 1.05 | 1.61 |
| Additional Reagents | | | | | | |
| 6,2-alcohol (g) | 0.16 | 0.14 | 0.13 | 0.16 | 0.27 | 0.24 |
| Sodium Carbonate (g) | 0.01 | 0.01 | 0.03 | 0.02 | 0.02 | 0.02 |
| DESMODUR N100 (g) | 0.30 | 0.35 | 0.30 | 0.30 | 0.60 | 0.60 |
| Water (g) | 0.04 | 0.04 | 0.03 | — | — | — |
| Cotton Performance | | | | | | |
| Water Drop | 10 | 3 | 9 | 3 | 4 | 6 |
| Oil Drop | 3 | 1 | 5 | 0 | 2 | 4 |
| Spray | 85 | 70 | 80 | 70 | 90 | 60 |

TABLE 15-continued

Reagents and Performance of Examples 35-40

| | Example | | | | | |
|---|---|---|---|---|---|---|
| | 35 | 36 | 37 | 38 | 39 | 40 |
| Polyester Performance | | | | | | |
| Water Drop | 8 | 4 | 7 | 3 | 4 | 3 |
| Oil Drop | 4 | 2 | 4 | 1 | 4 | 3 |
| Spray | 85 | 70 | 80 | 70 | 70 | 60 |

Examples 41-46

Amounts of reagents used are shown in Table 16. In a small vial, DESMODUR N100, FeCl$_3$ catalyst (0.02-0.04 g, 0.5 weight % solution in MIBK), and extra MIBK (0.65 g) were heated to 60° C. MPEG 750 and sodium carbonate were added next and the temperature was increased to 95° C. After holding the reaction for 1 hour at 95° C., isocyanate-reactive polymer (0.00045 mol OH) was added. The reaction mixture was stirred and heated at 90° C. overnight. If reaction tested positive for active isocyanates, ~0.03 g of DI water and extra catalyst were added. Once the reaction testing negative for active isocyanates, the reaction was diluted to 10% solids in MIBK, applied to fabric, and tested according to the above test methods.

TABLE 16

Reagents and Performance of Examples 41-46

| | Example | | | | | |
|---|---|---|---|---|---|---|
| | 41 | 42 | 43 | 44 | 45 | 46 |
| Hydroxy-functional Polymer | | | | | | |
| Polymer Used | P1 | P2 | P3 | P4 | P13 | P14 |
| Amount Used (g) | 3.91 | 5.62 | 4.20 | 5.58 | 1.11 | 1.20 |
| Additional Reagents | | | | | | |
| MPEG 750 (g) | 0.71 | 0.69 | 0.70 | 0.74 | 1.38 | 1.38 |
| Sodium Carbonate (g) | 0.01 | 0.01 | 0.01 | 0.01 | 0.02 | 0.02 |
| DESMODUR N100 (g) | 0.24 | 0.25 | 0.25 | 0.25 | 0.50 | 0.50 |
| Water (g) | 0.05 | 0.04 | — | — | — | — |
| Cotton Performance | | | | | | |
| Water Drop | 10 | 4 | 8 | 4 | 6 | 3 |
| Oil Drop | 5 | 0 | 5 | 0 | 4 | 0 |
| Spray | 75 | 70 | 70 | 70 | 70 | 60 |
| Corn Oil | 3 | 1 | 1 | 1 | 3 | 2 |
| Mineral Oil | 2 | 1 | 1 | 1 | 1 | 2 |

Examples 47-52

Example 41 was repeated, using the reagents in Table 17.

TABLE 17

Reagents and Performance of Examples 47-52

| | Example | | | | | |
|---|---|---|---|---|---|---|
| | 47 | 48 | 49 | 50 | 51 | 52 |
| Hydroxy-functional Polymer | | | | | | |
| Polymer Used | P5 | P6 | P7 | P8 | P15 | P16 |
| Amount Used (g) | 3.95 | 7.31 | 4.32 | 6.12 | 1.36 | 1.89 |

TABLE 17-continued

Reagents and Performance of Examples 47-52

| | Example | | | | | |
|---|---|---|---|---|---|---|
| | 47 | 48 | 49 | 50 | 51 | 52 |
| Additional Reagents | | | | | | |
| MPEG 750 (g) | 0.71 | 0.70 | 0.70 | 0.69 | 1.38 | 1.38 |
| Sodium Carbonate (g) | 0.01 | 0.01 | 0.01 | 0.01 | 0.02 | 0.02 |
| DESMODUR N100 (g) | 0.24 | 0.25 | 0.25 | 0.25 | 0.50 | 0.50 |
| Water (g) | — | — | 0.06 | — | — | — |
| Cotton Performance | | | | | | |
| Water Drop | 7 | 4 | 6 | 3 | 6 | 3 |
| Oil Drop | 5 | 0 | 5 | 0 | 5 | 0 |
| Spray | 80 | 70 | 70 | 80 | 70 | 60 |
| Corn Oil | 2 | 1 | 2 | 1 | 3 | 3 |
| Mineral Oil | 2 | 1 | 1 | 1 | 2 | 3 |

Examples 53-58

Example 41 was repeated, using the reagents in Table 18.

TABLE 18

Reagents and Performance of Examples 53-58

| | Example | | | | | |
|---|---|---|---|---|---|---|
| | 53 | 54 | 55 | 56 | 57 | 58 |
| Hydroxy-functional Polymer | | | | | | |
| Polymer Used | P9 | P10 | P11 | P12 | P17 | P18 |
| Amount Used (g) | 4.00 | 6.46 | 4.39 | 6.68 | 1.06 | 1.98 |
| Additional Reagents | | | | | | |
| MPEG 750 (g) | 0.71 | 0.70 | 0.70 | 0.69 | 1.38 | 1.38 |
| Sodium Carbonate (g) | 0.01 | 0.01 | 0.01 | 0.01 | 0.02 | 0.02 |
| DESMODUR N100 (g) | 0.24 | 0.25 | 0.25 | 0.25 | 0.50 | 0.50 |
| Water (g) | — | 0.04 | 0.09 | — | — | — |
| Cotton Performance | | | | | | |
| Water Drop | 10 | 4 | 8 | 3 | 7 | 3 |
| Oil Drop | 5 | 0 | 6 | 0 | 5 | 0 |
| Spray | 70 | 75 | 80 | 70 | 70 | 60 |
| Corn Oil | 2 | 3 | 1 | 1 | 3 | 3 |
| Mineral Oil | 2 | 2 | 1 | 1 | 2 | 3 |

The compounds, compositions, method, and substrates of the present invention are useful to provide excellent water repellency and optionally stain release to treated substrates. The surface properties are obtained using a non-fluorinated or partially fluorinated organic polymer as defined above. The use of non-fluorinated or partially fluorinated organic polymers have been found to provide superior water repellency and durable water repellency compared to traditional non-fluorinated water repellents and are comparable to commercially available fluorinated water repellents.

What is claimed is:

1. A polymer compound comprising the repeat units of Formula (I):

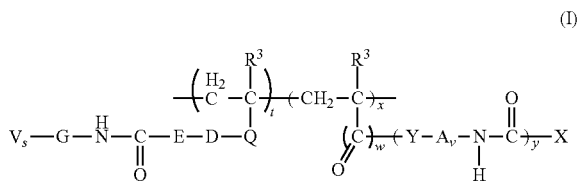

(I)

wherein
$R^3$ is selected from H or a $C_1$ to $C_4$ alkyl group;
x and t are integers from 1 to 200;
Q is C(O)O, C(O)NH, or a direct bond;
D is a $C_1$ to $C_6$ linear or branched alkylene, an arylene group, or $(CH_2CH_2O)_n(CH(CH_3)CH_2O)_m$;
E is O, S, $NR^5$, or a direct bond;
provided that E is a direct bond when D is $(CH_2CH_2O)_n(CH(CH_3)CH_2O)_m$;
$R^5$ is H or a monovalent $C_1$ to $C_6$ alkyl;
G is the residue of a diisocyanate or polyisocyanate;
V is a group selected from urethane, urea, or thiourea that bonds to other parts of the polymer compound or to a monovalent blocking group;
s is 1 to 5;
Y is selected from O, a substituted arylene group, or an unsubstituted arylene group;
A is a linear or branched $C_1$ to $C_{10}$ alkylene group;
w is 0 or 1;
v is 0 or 1;
y is 0 or 1;
provided that w+y is at least 1; if w is 0 then Y is a substituted or unsubstituted arylene group; and if Y is O then v is 1;
X is the residue of a cyclic or acyclic sugar alcohol which is substituted with at least one —$R^1$, —C(O)$R^1$, —$(CH_2CH_2O)_n(CH(CH_3)CH_2O)_mR^2$, —$(CH_2CH_2O)_n(CH(CH_3)CH_2O)_mC(O)R^1$, or mixtures thereof;
where the cyclic or acyclic sugar alcohol is selected from a saccharide, reduced sugar, aminosaccharide, aldonic acid, or aldonic acid lactone; wherein
each n is independently 0 to 20;
each m is independently 0 to 20;
m+n is greater than 0;
each $R^1$ is independently a linear or branched alkyl group having 5 to 29 carbons optionally comprising at least 1 unsaturated bond; and
each $R^2$ is independently —H, a linear or branched alkyl group having 6 to 30 carbons optionally comprising at least 1 unsaturated bond, or mixtures thereof.

2. The polymer compound of claim 1 wherein X is at least 50% bio-based derived.

3. The polymer compound of claim 1 wherein X is 100% bio-based derived.

4. The polymer compound of claim 1 wherein X is selected from Formulas (IIa), (IIb), or (IIc):

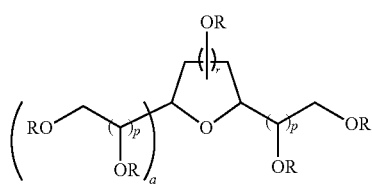

(IIa)

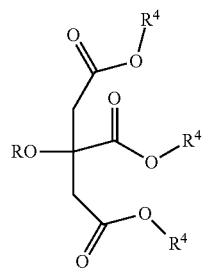

(IIb)

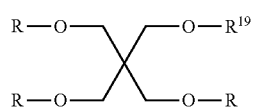

(IIc)

wherein each R is independently a direct bond to C=O of Formula I, —H, —$R^1$, —C(O)$R^1$, —$(CH_2CH_2O)_n(CH(CH_3)CH_2O)_mR^2$, or —$(CH_2CH_2O)_n(CH(CH_3)CH_2O)_mC(O)R^1$;
n and m are defined as above;
m+n is greater than 0;
r is 1 to 3;
a is 0 or 1;
p is independently chosen from 0 to 2;
provided that a is 0 when r is 3;
each $R^1$ and $R^2$ are defined as above;
provided when X is Formula (IIa), then one R is a direct bond to C=O of Formula 1; and at least one R is a —$R^1$, —C(O)$R^1$, —$(CH_2CH_2O)_n(CH(CH_3)CH_2O)_mR^2$, or —$(CH_2CH_2O)_n(CH(CH_3)CH_2O)_mC(O)R^1$;
each $R^4$ is independently a direct bond to C=O of Formula I; —H, a linear or branched alkyl group having 6 to 30 carbons optionally comprising at least 1 unsaturated bond or combinations thereof, —$(CH_2CH_2O)_n(CH(CH_3)CH_2O)_mR^2$, or —$(CH_2CH_2O)_n(CH(CH_3)CH_2O)_mC(O)R^1$;
provided when X is Formula (IIb), then one R or $R^4$ is a direct bond to C=O of Formula 1; and at least one R or $R^4$ is a linear or branched alkyl group optionally comprising at least 1 unsaturated bond or combinations thereof, —$(CH_2CH_2O)_n(CH(CH_3)CH_2O)_mR^2$, or —$(CH_2CH_2O)_n(CH(CH_3)CH_2O)_mC(O)R^1$; and
each $R^{19}$ is a direct bond to C=O of Formula I, —H, —C(O)$R^1$, or —$CH_2C[CH_2OR]_3$,
provided when X is Formula (IIc), then one $R^{19}$ or R is a direct bond to C=O of Formula I; and at least one $R^{19}$ or R is —C(O)$R^1$, —$(CH_2CH_2O)_n(CH(CH_3)CH_2O)_mR^2$, or —$(CH_2CH_2O)_n(CH(CH_3)CH_2O)_mC(O)R^1$.

5. The polymer compound of claim 4 wherein X is selected from Formula (IIa) to be Formula (IIa'):

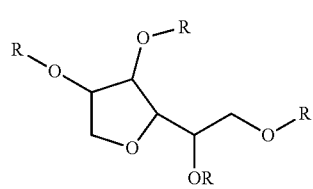

(IIa')

wherein R is further limited to independently a direct bond to C=O, —H, —$R^1$, or —C(O)$R^1$.

6. The polymer compound of claim 4 wherein X is selected from Formula (IIa) to be Formula (IIa'):

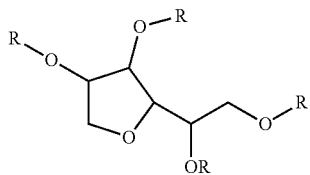
(IIa')

wherein R is further limited to independently a direct bond to C=O, —H, —(CH$_2$CH$_2$O)$_n$(CH(CH$_3$)CH$_2$O)$_m$R$^2$, or —(CH$_2$CH$_2$O)$_n$(CH(CH$_3$)CH$_2$O)$_m$C(O)R$^1$.

7. The polymer compound of claim 4 wherein X is selected from formula (IIb).

8. The polymer compound of claim 4 wherein X is selected from formula (IIc).

9. The polymer composition of claim 1 wherein G is selected from Formulas (IIIa), (IIIb), (IIIc), (IIId), or (IIIe):

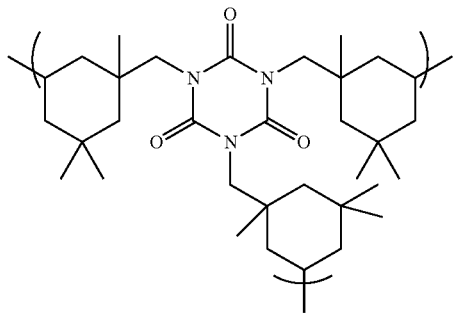
(IIIa)

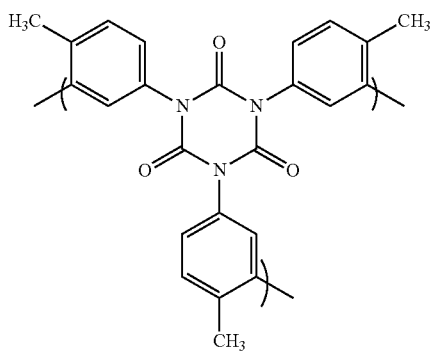
(IIIb)

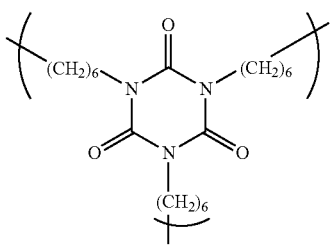
(IIIc)

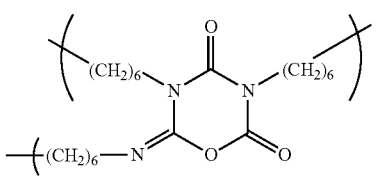
(IIId)

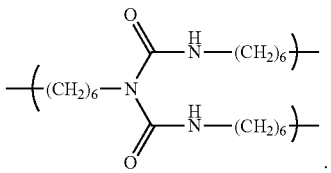
(IIIe)

10. The polymer composition of claim 1, where at least one V is bonded to at least one blocking group selected from a C$_1$ to C$_{30}$ linear or branched alkyl optionally comprising at least one unsaturated group, a linear or branched C$_1$ to C$_{30}$ polyether, a residue X as defined above, or a C$_1$ to C$_{20}$ linear or branched fluoroalkyl optionally interrupted by O, CH$_2$, CH$_2$CH$_2$, or SO$_2$NH.

* * * * *